(12) United States Patent
Nakamura

(10) Patent No.: US 8,970,916 B2
(45) Date of Patent: Mar. 3, 2015

(54) IMAGE PROCESSING APPARATUS AND METHOD OF SUPPLEMENTING PIXEL VALUE

(75) Inventor: Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/977,128

(22) PCT Filed: Jan. 23, 2012

(86) PCT No.: PCT/JP2012/051902
§ 371 (c)(1),
(2), (4) Date: Jun. 28, 2013

(87) PCT Pub. No.: WO2012/102402
PCT Pub. Date: Aug. 2, 2012

(65) Prior Publication Data
US 2013/0271798 A1  Oct. 17, 2013

(30) Foreign Application Priority Data
Jan. 28, 2011  (JP) .................................. 2011-016125

(51) Int. Cl.
*H04N 1/38*  (2006.01)
*H04N 1/409*  (2006.01)
(Continued)

(52) U.S. Cl.
CPC ................. *H04N 1/409* (2013.01); *H04N 1/40* (2013.01); *G06T 5/005* (2013.01); *G06T 2207/10008* (2013.01)
USPC ............ 358/463; 358/1.12; 358/1.1; 358/1.9; 358/447; 382/144; 382/254; 375/240.27

(58) Field of Classification Search
USPC ..................................................... 358/1.2, 1.1
See application file for complete search history.

(56) References Cited

U.S. PATENT DOCUMENTS

| 7,474,437 | B2 | 1/2009 | Ishido |
| 2007/0064995 | A1 | 3/2007 | Oaki et al. |
| 2010/0290092 | A1 | 11/2010 | Tabata |

FOREIGN PATENT DOCUMENTS

| JP | 2003-348336 | 12/2003 |
| JP | 2004-072528 | 3/2004 |
| JP | 2007-087210 | 4/2007 |

(Continued)

OTHER PUBLICATIONS

Nakagawa, Image Interpolation Device,Jun. 7, 2007,JP 2007142667 A.*

(Continued)

*Primary Examiner* — Martin Mushambo
(74) *Attorney, Agent, or Firm* — IPUSA, PLLC

(57) ABSTRACT

Provided is an image processing apparatus including a periodicity determining unit that determines whether a determination area including a target defective pixel is a periodicity area, a first pixel value generating unit that generates a pixel value by a first supplementing method, a second pixel value generating unit that generates a pixel value by a pixel second supplementing method, a control unit that determines which of the first pixel value generating unit and the second pixel value generating unit is to be used based on the determination by the periodicity determining unit, a pixel value supplementing unit that inserts the pixel value generated by the pixel value generating unit determined to be adopted, and a pixel value updating unit that updates pixel values of neighboring pixels of the defective pixel.

15 Claims, 16 Drawing Sheets

(51) Int. Cl.
*H04N 1/40* (2006.01)
*G06T 5/00* (2006.01)

(56) References Cited

FOREIGN PATENT DOCUMENTS

| JP | 2008-154281 | 7/2008 |
|---|---|---|
| JP | 4330164 | 9/2009 |
| JP | 2010-178174 | 8/2010 |

OTHER PUBLICATIONS

Matsuoka, Method and Program for Interpolation Processing, Recording Medium With the Same Recorded Thereon, Image Processor and Image Forming Device Provided With the Same, Mar. 4, 2004, JP 2004072528 A.*
Extended European Search Report dated Nov. 6, 2013.
International Search Report Issued on Mar. 27, 2012 in PCT/JP2012/051902 filed on Jan. 23, 2012.

* cited by examiner

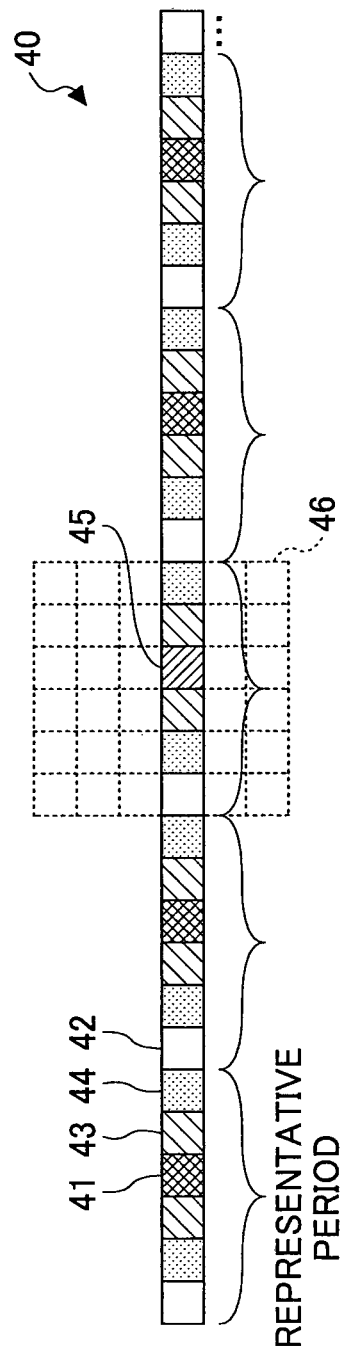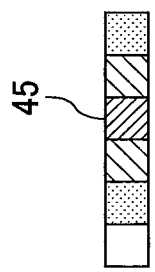

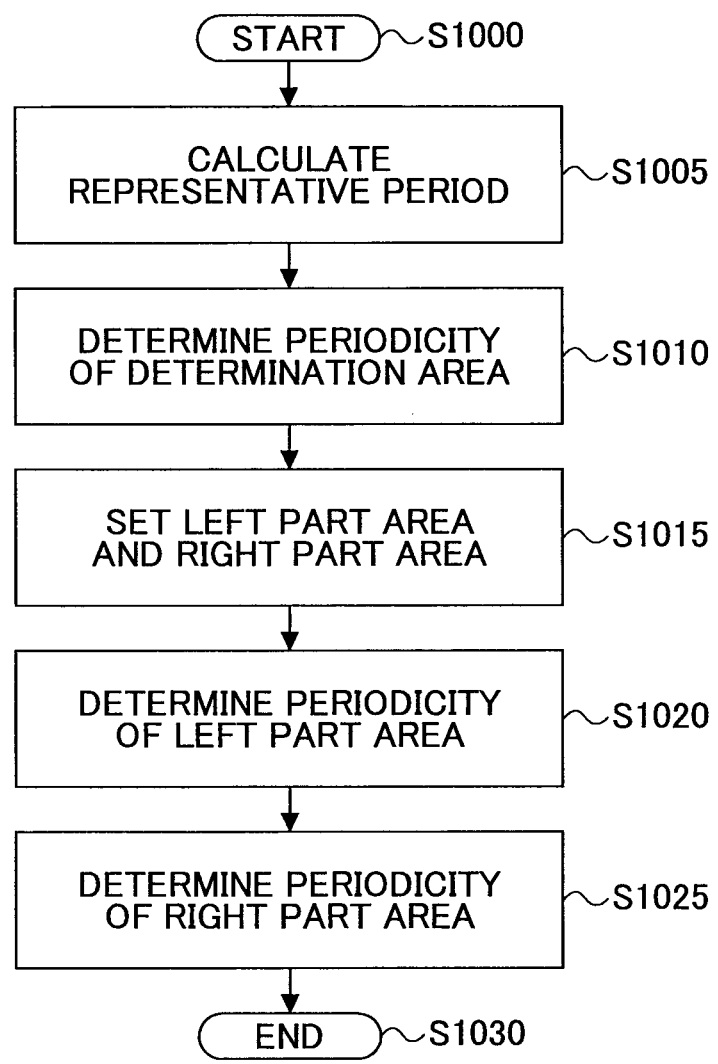

IMAGE PROCESSING APPARATUS AND METHOD OF SUPPLEMENTING PIXEL VALUE

TECHNICAL FIELD

The present invention relates to an image processing apparatus and a method of supplementing a pixel value, and more specifically, to an image processing apparatus and a method capable of supplementing a pixel value of a pixel having a missing pixel value or an incorrect pixel value.

BACKGROUND ART

As a scanner device that reads an image using an optical unit, a scanner device adopting a contact image sensor (CIS) and a scanner device adopting a charge coupled device (CCD) are known. For the scanner device adopting the CIS, as the document is to be in contact with a reading surface, it is not suitable for reading a three-dimensional object. However, the scanner device adopting the CIS is widely used today as it is thinner and cheaper than that of adopting the CCD and a technique to reduce noises apt to be generated in read image data is improved. For example, the CIS is adopted for reading an image on a back surface of a document in an image reading apparatus capable of reading both sides of images on a document in a single pathway.

Here, for the CIS, light emitting diodes (LEDs) of RGB are used for an optical source where lights of RGB are switched at a high-speed. A light from a document is input to an image sensor (CMOS image sensor) through a lens, and the light input to the image sensor is converted into a voltage value of each pixel to be output.

The scanner device adopting the CIS adopts a contact image sensor where a single line of an image on a document is read with the document being in contact with the sensor by a roller. As it is difficult to form a single long sensor, a reading unit of the CIS is composed of plural short sensors aligned in a longitudinal direction. Therefore, this may cause a certain gap between sensors and an image signal cannot be obtained at the gap. As a result, a pixel with no pixel value (a missing pixel value) is generated.

Although not limited to the scanner device adopting the CIS there may be a situation where image data includes a pixel with a missing pixel value or an incorrect pixel value caused by a deficiency of a sensor reading an image or an obstruction that exists in an optical path such as a contamination on the contact glass on which a document is to be set or the like.

Existence of such a pixel with the missing pixel value or the incorrect pixel value causes a decrease in an image quality. Therefore, a technique to estimate a pixel value of the pixel with the missing pixel value or the incorrect pixel value based on pixel values of surrounding pixels and substituting the missing pixel value or the incorrect pixel value by the estimated value is known.

For example, an interpolation method where a pixel value of a target pixel for which a pixel value is to be supplemented, is estimated by the pixel values of surrounding pixels, such as linear interpolation, polynomial interpolation using plural functions, spline interpolation or the like is known. However, although an interpolation method using the linear interpolation is adaptable to interpolate a pixel value of a pixel included in an area where a variation of gradation is small, the interpolation method is not adaptable for an area where a variation of gradation is large such as a halftone area.

The interpolation method using polynomial interpolation or spline interpolation can estimate a pixel value of a target pixel in an image such as a digital photograph or the like with high accuracy, where a sampling period is short enough with respect to a variation period of the image. However, as for a halftone image, because the resolution of the image may not be defined enough with respect to screen ruling of halftone dots, a sampling period may be ambiguous with respect to a variation period of the image and therefore difficult to estimate an accurate pixel value.

Therefore, in order to solve such a problem by interpolation, a pattern matching method is proposed. With this method, a pixel value of a target pixel in an area having a high frequency (with a short variation period), which is difficult to be estimated by interpolation as described above, can be estimated using a similar pattern positioned near the target pixel.

However, according to the pattern matching method, although an optimum similar pattern for a standard pattern including a target pixel, which is a template, can be obtained, as the similar pattern is selected by using a larger number of pixel values of pixels included in the standard pattern compared with a case using interpolation, the selected similar pattern may not always include an optimum pixel value for the target pixel. This problem occurs because when searching a pattern similar to a standard pattern by pattern matching, a pattern slightly different from the standard pattern as a whole and a pattern a large part of which is the same but including a small part which is largely different from the standard pattern is not discriminated.

Especially, for a halftone area with high screen ruling where only specific pixels have pixel values, the way of selecting a similar pattern has a large influence on the estimation of a pixel value of a target. For a halftone area with a lower concentration, in which a large part of the area is composed of a background, a background area is either detected to be a similar pattern or a similar pattern cannot be detected.

As described above, it may be necessary to use an appropriate method when supplementing a pixel value of a target pixel based on a characteristic of an area including the target pixel.

According to Japanese Patent Number 4330164, device that uses a pattern matching method in which a pattern similar to a target pattern including a target pixel, is selected and a pixel value of a pixel in the selected pattern positioned at a position corresponding to the target pixel is used as an estimated pixel value for the target pixel, when the target pixel is in a halftone area is described.

In the device, whether the target pixel corresponding to a gap between contact image sensors exists in a halftone area or exists in a non-halftone area is determined, then, a pixel value of the target pixel is generated using linear interpolation when the target pixel is determined to exist in the non-halftone area while a pixel value of the target pixel is generated using pattern matching when the target pixel is determined to exist in the halftone area.

At this time, when using pattern matching, a standard block including the target pixel and plural reference blocks having the same size as the standard block, and not including the target pixel, are set in an image near the target pixel. Correlation values between the standard block and each of the reference blocks are calculated based on the pixel values in the standard block and in each of the reference blocks. The reference block, the correlation value for which is the maximum, is selected, and a pixel value of a pixel in the selected reference block corresponding to the target pixel is determined as an estimated pixel value for the target pixel.

However with a supplementing method conventionally known, there is a problem that when a pixel value of a target pixel is not estimated precisely enough, the difference between pixel values of the target pixel and pixels around the target pixel become too large giving a discontinuous image. Further, for a CIS adopting a contact image sensor, the width of a gap between sensors is assumed to be an integral multiple of the width of a pixel although the width of the gap between the sensors may not be an integral multiple of the width of the pixel because of an error in constructing. When such an error occurs, a distortion may be caused between an image area read by one of the sensors and an image area read by another one of the sensors.

For example, when an image including lines drawn parallel to each other are read along a sub scanning direction, the distance between two of the lines where a gap exists between the two lines becomes different from the distances between the other two lines. Further, when an image including a line extending in an inclined direction with respect to the sub scanning direction is read, if an error of the sensors occurs in constructing, the line may shift in the left and the right directions and the upper and the lower directions for each areas of the image data respectively, corresponding to the sensors. For these cases, as the image includes lines extending along the sub scanning direction or the image includes a single line, there is no serious effect on the image quality even if such an error occurs. This is because a number of gaps that cause an influence on the image are not so large and the distortion generated by the gaps may not easy to be found.

However, as for a halftone image, such an error may have serious influence on the image quality. For a halftone image, halftone dots are aligned on lines having a screen angle with respect to the horizontal direction, which is a main scanning direction, with a predetermined period (screen ruling), for example, the screen ruling is approximately 40 to 200 per inch. Especially for an image with high screen ruling, the distance between the halftone dots becomes very close at about 0.1 mm, and construction errors of the sensors cannot be ignored.

Further, when the halftone dot exists at the gap between the sensors, the shape of the halftone dot is altered by the error in constructing and a pixel value of a target pixel having no pixel value because of the gap is difficult to be estimated. Therefore, the estimated pixel value for the target pixel may be different when the pixel value is estimated by the pixels in an area positioned left side of the target pixel and when the pixel value is estimated by the pixels in an area positioned right side of the target pixel. In such a case, it is difficult to find an exact pixel value for the target pixel. Even when an average of such pixel values is supplemented for the target pixel, discontinuity may occur between the target pixel and peripheral pixels of the target pixel.

SUMMARY OF INVENTION

The present invention is made in light of the above problems, and provides an apparatus or a method capable of supplementing a pixel value of a defective pixel, which is a target pixel, that originally has a missing pixel value or an incorrect pixel value, and absorbing discontinuity of the target pixel and peripheral pixels of the target pixel so that the target pixel can conform with the peripheral pixels.

The present invention has been made based on the knowledge the inventors have thus obtained and has the following configurations.

According to an embodiment, there is provided an image processing apparatus including, a periodicity determining unit that sets a determination area including a defective pixel having a pixel value to be supplemented in a target image and determines whether the determination area is a periodicity area where pixel values of pixels included in the determination area periodically vary or a non-periodicity area where pixel values of pixels included in the determination area do not periodically vary; a first pixel value generating unit that generates a candidate pixel value of the defective pixel and candidate pixel values of neighboring pixels positioned near the defective pixel and included in a predetermined area by a first supplementing method; a second pixel value generating unit that generates a candidate pixel value of the defective pixel by a second supplementing method different from the first supplementing method; a control unit that determines which of the first pixel value generating unit and the second pixel value generating unit is to be adopted to generate the candidate pixel value of the defective pixel based on the determination by the periodicity determining unit; a pixel value supplementing unit that inserts the candidate pixel value of the defective pixel generated by either one of the first pixel value generating unit or the second pixel value generating unit determined to be adopted by the control unit; and a pixel value updating unit that updates pixel values of the neighboring pixels using the candidate pixel values of the neighboring pixels generated by the first pixel value generating unit when the first pixel value generating unit is determined to be adopted by the control unit.

With this structure, a supplementing operation can be performed with high accuracy for an image where pixel values drastically change. Further, as at least the first pixel value generating unit generates pixel values of the neighboring pixels in addition to the pixel value of the defective pixel, and the pixel value updating unit updates the pixel values of the neighboring pixels when the first pixel value generating unit is determined to be adopted. The discontinuity between the defective pixel and the peripheral pixel, which is a peripheral position further than that of the neighboring pixels, can be reduced and the defective pixel can be conformed to other pixels.

For the first supplementing method, a pattern matching method may be used, and for the second supplementing method, interpolation may be used, for example.

In another embodiment, there is provided a method of supplementing a pixel value of a defective pixel having a pixel value to be supplemented included in a target image, including, determining whether a determination area set to include the defective pixel is a periodicity area where pixel values of pixels included in the determination area periodically vary or a non-periodicity area where pixel values of pixels included in the determination area do not periodically vary; determining which of a first pixel value generating unit in which a candidate pixel value of the defective pixel and candidate pixel values of neighboring pixels positioned near the defective pixel and included in a predetermined area are generated by a first supplementing method and a second pixel value generating unit in which a candidate pixel value of the defective pixel is generated by a second supplementing method different from the first supplementing method is to be adopted to generate the candidate pixel value of the defective pixel based on the determination whether the determination area is the periodicity area or the non-periodicity area; inserting the candidate pixel value of the defective pixel generated by either one of the first pixel value generating unit or the second pixel value generating unit determined to be adopted; and updating pixel values of the neighboring pixels using the candidate pixel values of the neighboring pixels generated by the first pixel value generating unit when the first pixel value generating unit is determined to be adopted to generate the candidate of the pixel value of the defective pixel.

In another embodiment, there is provided a program readable by a computer to actualize the method of supplementing the pixel value of the defective pixel as described above, or a recording medium that stores the program may also be provided. The recording medium may be a FD, a CD, a DVD, a SD card, a USB memory or the like to be distributed.

BRIEF DESCRIPTION OF DRAWINGS

Other objects, features and advantages of the present invention will become more apparent from the following detailed description when read in conjunction with the accompanying drawings.

FIG. 6A is an explanatory view showing the example of the pixels same as that shown in FIG. 4A;

FIG. 6B is an explanatory view showing the pixels corresponding to the representative period including the defective pixel;

FIG. 10 is a flowchart showing the operation of step S910 and step S915 in FIG. 9 in detail;

DESCRIPTION OF EMBODIMENTS

Figure 1:
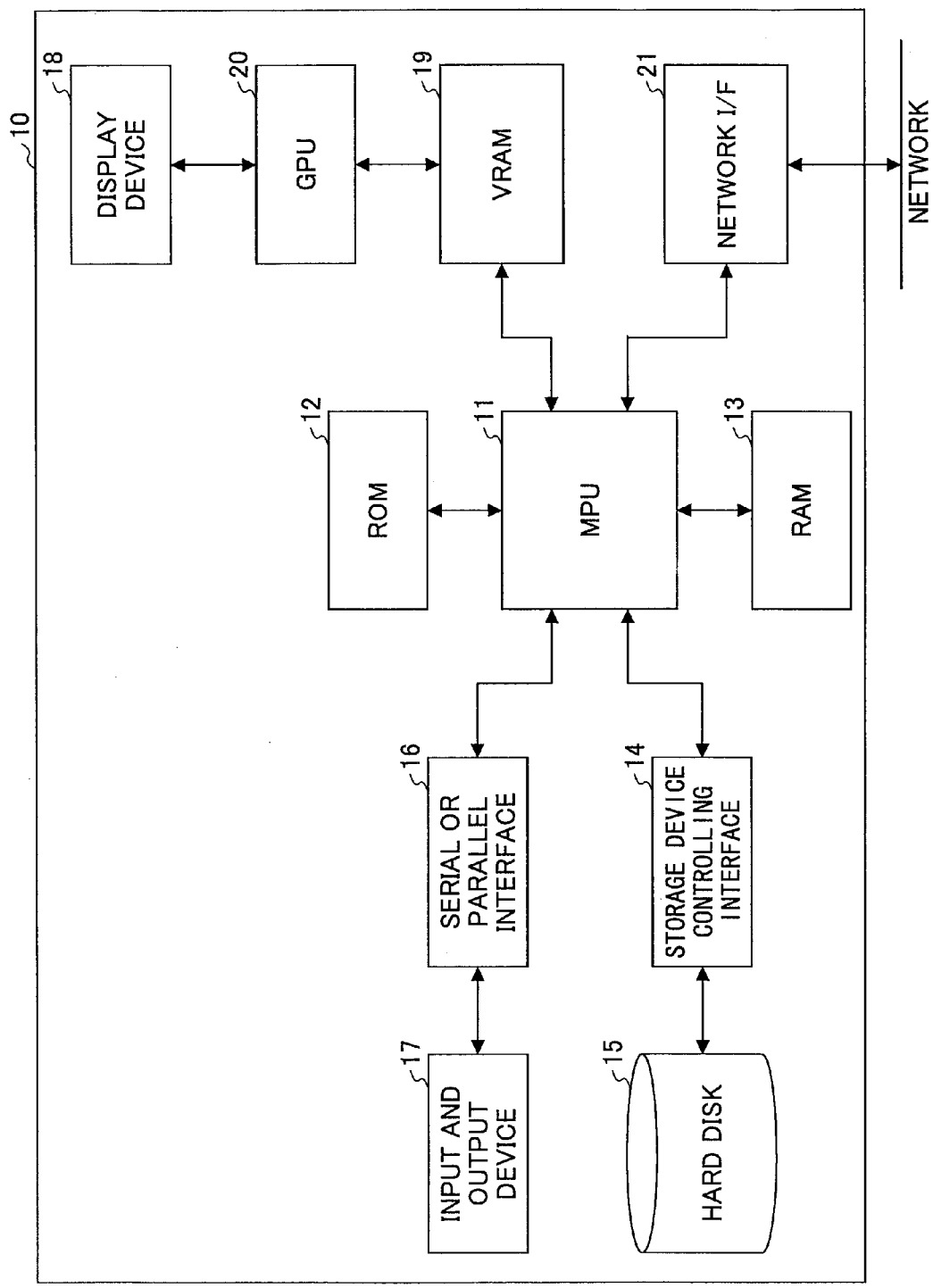
FIG. 1 is a block diagram showing an example of a hardware structure of an image processing apparatus of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described below with reference to drawings.

It is to be noted that, in the explanation of the drawings, the same components are given the same reference numerals, and explanations are not repeated.

According to an embodiment, a pixel value of a pixel (a defective pixel) having a missing pixel value or an incorrect pixel value is estimated and supplemented. Further, pixel values of neighboring pixels positioned near the defective pixel and included in a predetermined area including the defective pixel are also estimated and altered so that the pixel values of the defective pixel, the neighboring pixels and pixels positioned further from the neighboring pixels become continuous. If the pixel values drastically change within a short distance, the variation may be recognized easily, however, according to the embodiment, the discontinuity can be reduced by altering the pixel values of the neighboring pixels as well.

First Embodiment

An image processing apparatus according to the present embodiment is connected with a scanner device that reads an image on a document or the like, directly or via a network through a cable.

The scanner device may be not so limited to a scanner device adopting a CIS. As described above, as image data obtained by such a scanner device may include pixels having a missing pixel value or an incorrect pixel value caused by a gap between sensors or the like, the image processing apparatus performs a supplementing operation in which a right pixel value for such a pixel having a missing pixel value or an incorrect pixel value is estimated and supplemented.

Hereinafter, a pixel having a missing pixel value or an incorrect pixel value and for which the right pixel value is to be estimated and supplemented is simply referred to as a "defective pixel".

The image processing apparatus of the embodiment accepts input of image data for which the supplementing operation is to be performed, specifies a defective pixel, determines which of the supplementing methods is to be adopted, obtains a right pixel value to be supplemented for the defective pixel by the supplementing method, further obtains pixel values for neighboring pixels existing in the neighborhood of the defective pixel in order to reduce discontinuity between the defective pixel and peripheral pixels which exist further than the neighboring pixels, and updates pixel values of the neighboring pixels.

Here, the pixel value may be a range between 0 and 255 for gray scale image data in which a single pixel is expressed by 8-bits where the pixel value is 0 for black and the pixel value is 255 for white. Alternatively, the pixel value may be a range between 0 and 255 for each of red, green and blue components for color image data in which a single pixel is expressed by 8-bits for each of the components where the pixel values of all of the components are 0 for black and the pixel values of all of the components are 255 for white.

In order to actualize the above operations, the image processing apparatus is composed of a personal computer (PC), a work station, a server, a MFP or the like including a storage device that stores a program capable of executing the operations, a processor that reads out and executes the program, interfaces for connecting with the scanner device or the network.

FIG. 1 is a block diagram showing an example of a hardware structure of an image processing apparatus 10 of this embodiment.

The image processing apparatus 10 includes a micro processor unit (MPU) 11 as the processor, and a read only memory (ROM) 12 which is a nonvolatile memory that stores a basic input/output system (BIOS) or a firmware and a random access memory (RAM) 13 that provides an execution memory area for enabling a program operation by the MPU 11, as the storage device.

The image processing apparatus 10 further includes a storage device controlling interface 14, a hard disk 15, a serial or parallel interface 16, an input and output device 17, a display device 18, a video RAM (VRAM) 19, a graphics processing unit (GPU) 20, and a network I/F 21.

The MPU 11 is connected to the hard disk 15, which is one of the storage devices, via the storage device controlling interface 14. The storage device controlling interface 14 is one of the interfaces, connected with the MPU 11 through an internal bus and accesses the hard disk 15 to read out, execute and write various applications or data. For the storage device controlling interface 14, an interface capable of controlling input and output of the hard disk 15 in accordance with a standard such as Integrated Device Electronics (IDE), AT Attachment (ATA), serial ATA, Ultra ATA, or the like may be used.

The MPU 11 communicates with the input and output device 17 such as a keyboard, a mouse, a printer or the like to accept an input from a user by controlling the serial or parallel interface 16 such as a Universal Serial Bus (USB), IEEE 1394 or the like through the internal bus.

The VRAM 19 is a RAM used as the storage device for displaying video images on the display device 18 in accordance with an instructions from the MPU 11. The VRAM 19 processes a video signal in accordance with an instruction from the MPU 11 to display on the display device 18.

The GPU 20 is an integrated circuit for image data processing. The network I/F 21 is connected with the network to have the image processing apparatus 10 communicate with other devices.

For the image processing apparatus 10, the following operations can be actualized as the MPU 11 reads out programs stored in the storage devices such as the ROM 12, the hard disk 15 or a NV-RAM, a SD card or the like not shown in the drawings and develops in a memory area of the RAM 13 under an appropriate operating system (OS) where the MPU 11 can be structured as functional units for actualizing the operations. For the OS, Windows (registered trademark), UNIX (registered trademark), LINUX (registered trademark) or the like may be adopted. The image processing apparatus 10 is not limited to the above-described PC or the like and may be composed of an application specific integrated circuit (ASIC) in which plural circuits of plural functions are gathered for a specific usage.

Figure 2:
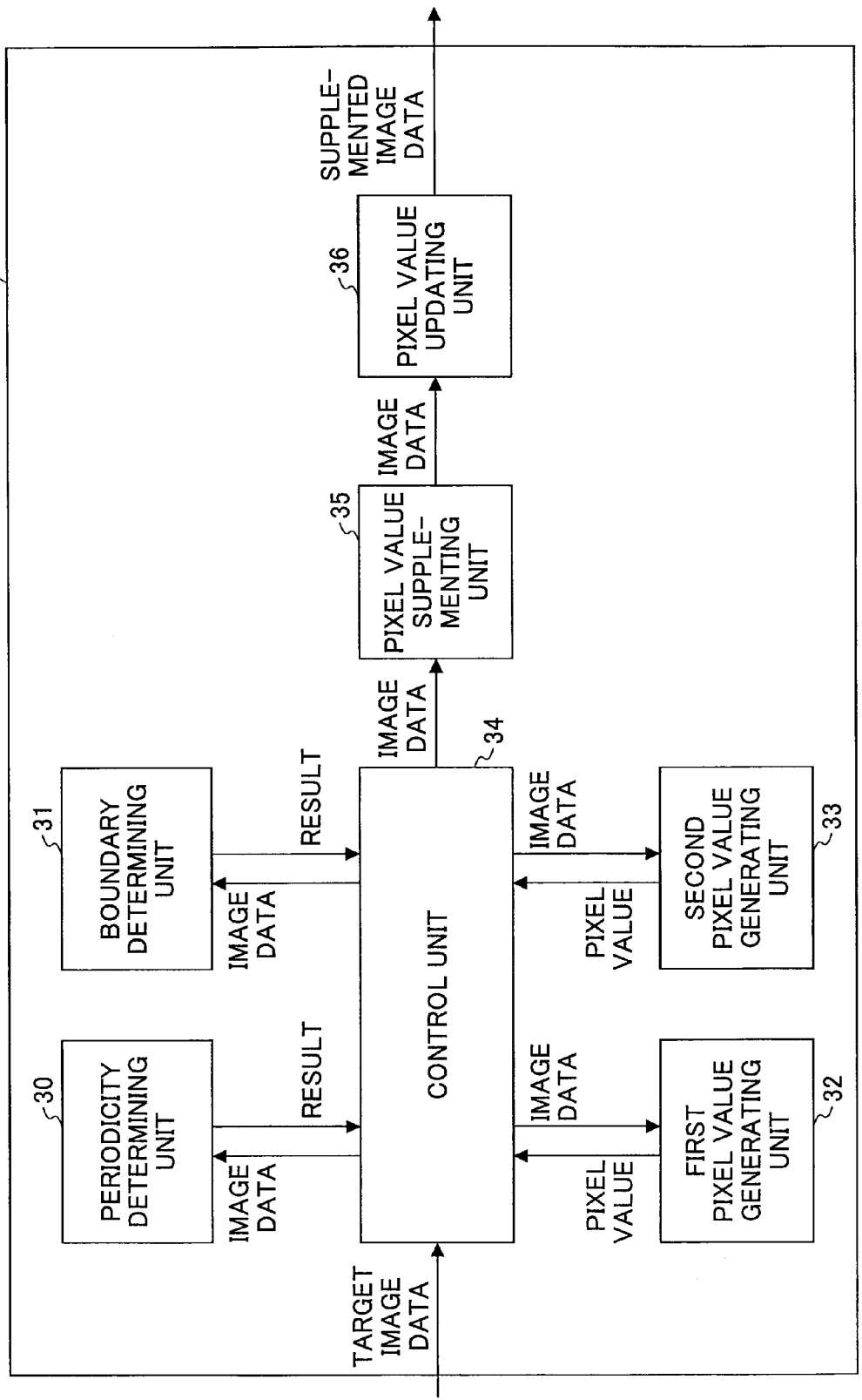
FIG. 2 is a block diagram showing an example of a functional structure of the image processing apparatus of the embodiment.

FIG. 2 is a block diagram showing an example of a functional structure of the image processing apparatus 10 of the embodiment.

As described above, for the image processing apparatus 10, each of the functions can be actualized as the MPU 11, which is the processor, reads out and executes programs stored in the storage device such as the ROM 12, the hard disk 15 or the like.

The image processing apparatus 10 includes a periodicity determining unit 30, a boundary determining unit 31, a first pixel value generating unit 32, a second pixel value generating unit 33, a control unit 34, a pixel value supplementing unit 35, and a pixel value updating unit 36.

Although not shown in the drawings, the image processing apparatus 10 may further includes a pixel setting unit that sets the defective pixel.

The pixel setting unit detects a defective pixel, which is a target pixel to be supplemented by inserting an estimated pixel value, in a target image data (hereinafter simply referred to as a "target image" as well). The position of the defective pixel may be previously detected and designated by a user, or may be detected by the pixel setting unit as follows.

The position may be, for example, expressed by a coordinate (x, y) where a coordinate of a left and lower corner is determined as a standard coordinate (0, 0), "x" is a pixel number increasing in the right direction from the standard coordinate, which is the same as the main scanning direction, and "y" is a pixel number increasing in the upper direction from the standard coordinate.

The pixel setting unit of the image processing apparatus 10 may detect the defective pixel, for example, by checking pixel values of each pixel in the target image data and selecting a pixel having the same or similar pixel value as a predetermined brightness or color, by reading a test image including pixels for which pixel values are previously known and evaluating the displacement amount between a pixel value of a pixel in image data obtained by reading the test image and a known pixel value of a corresponding pixel in the test image for all of the pixels, by detecting a position where periodicity of pixel values of pixels in the horizontal or the vertical direction becomes discontinuous and detecting the pixel positioned at the detected position as the defective pixel, or the like.

The defective pixel may correspond to an isolated dot or a part of a line composed by plural continuous dots. As the gap between the sensors may continuously exist along the sub-scanning direction, which is the moving direction of the image sensor, and in such a case, missing pixels composing a line may be generated.

Figure 3:
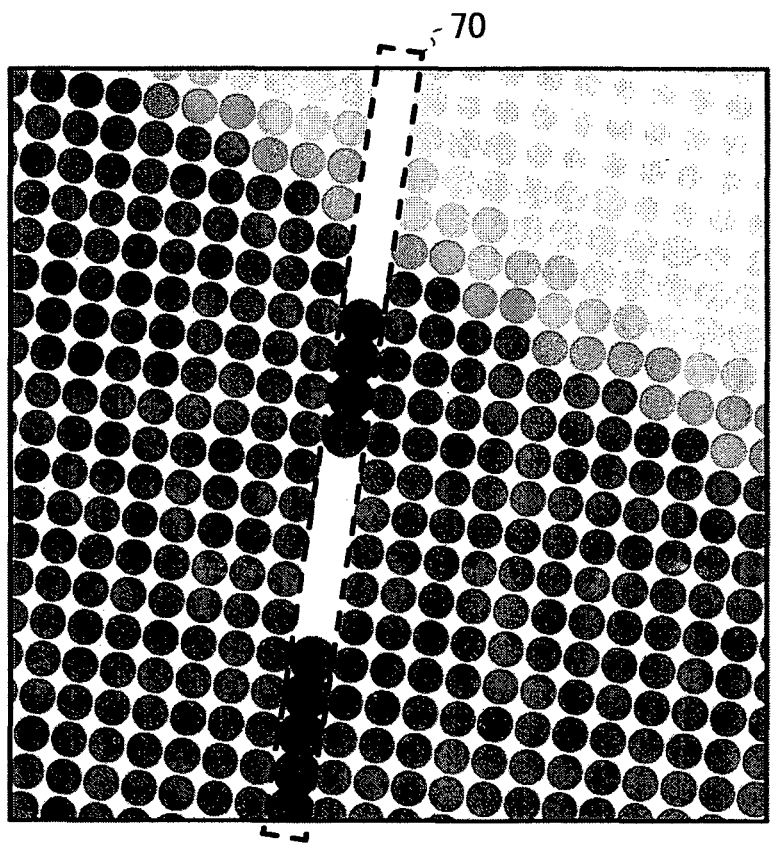
FIG. 3 is a drawing showing an example of image data in which defective pixels are included.

FIG. 3 is a drawing showing an example of image data in which defective pixels which are to be supplemented are included.

The image data includes halftone dots where plural black dots of almost the same size are substantially regularly aligned. The image data as shown in FIG. 3 has periodicity as the dots are aligned with a constant interval.

However, there is a split line 70 in the image data. The split line 70 is formed to split the image almost at the center and is composed of a part where the image is deleted and a part where the size of the dots is larger than that of others. The periodicity of the image data becomes discontinuous at the part of the split line 70. Therefore, by detecting a position where the periodicity in the horizontal direction becomes discontinuous, the defective pixel can be detected for such image data.

Referring back to FIG. 2, the periodicity determining unit 30 sets a determination area that includes the defective pixel and has a predetermined width in a horizontal direction and a predetermined height in a vertical direction. Then, the periodicity determining unit 30 determines whether a variation of the pixel values of pixels included in the determination area has periodicity. Hereinafter, an area where a variation of pixel values of the pixels included in the area has periodicity may be referred to as an "area having periodicity" as well. The determination area may be composed of a single line of pixels having a height equal to one pixel, or may be a rectangular area having a height equal to plural pixels.

The size of the determination area may be previously set by a user or may be dynamically set by the periodicity determining unit 30. Even for the case when the size of the determination area is dynamically set by the image processing apparatus 10, an initial size of the determination area is previously set. The image processing apparatus 10 performs the supplementing operation once with the previously set size of the determination area, when the supplementing operation is appropriately performed with the set size, the periodicity determining unit 30 reduces the size of the determination area and the image processing apparatus 10 performs the supplementing operation again with the reduced size of the determination area, and the image processing apparatus 10 can repeat this operation while reducing the size of the determination area for a predetermined ratio. On the other hand, when the supplementing operation is not appropriately performed with the set size, the periodicity determining unit 30 increases the size of the determination area and the image processing apparatus 10 performs the supplementing operation again with the increased size of the determination area, and the image processing apparatus 10 can repeat this operation while increasing the size of the determination area for a predetermined ratio.

Figure 4A:
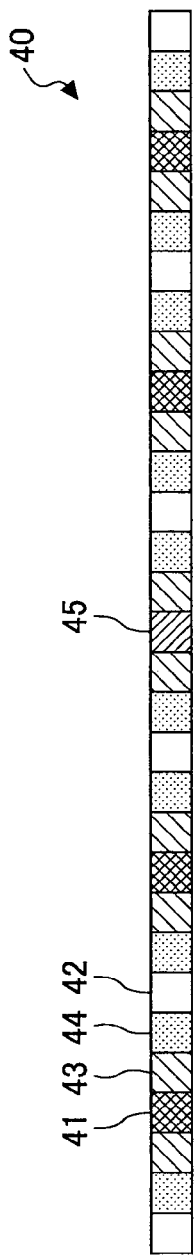
FIG. 4A is an explanatory view showing an example of pixels included in a determination area.

FIG. 4A is an explanatory view showing an example of pixels included in a determination area 40. In this example, the determination area 40 has a height equal to one pixel and a width equal to 31 pixels. In FIG. 4A, a black pixel 41 which is a halftone dot and a white pixel 42 which is a background are alternately aligned with a constant interval where gray pixels 43 and 44, having different pixel values to give gradation, are positioned between the black pixel 41 and the white pixel 42. The determination area 40 further includes a defective pixel 45 which has a missing pixel value caused by the gap.

Figure 4B:
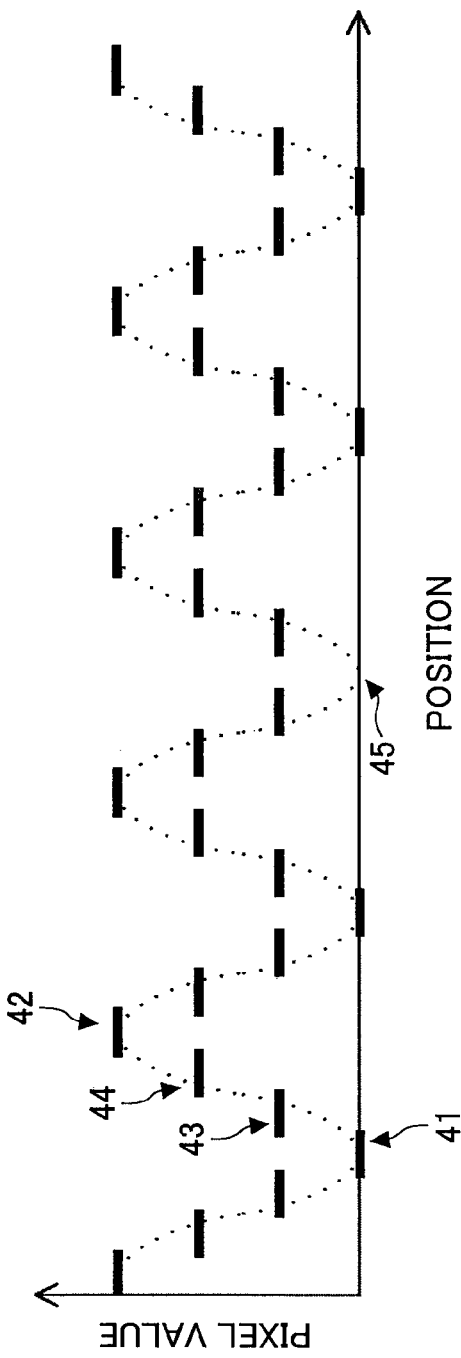
FIG. 4B is an explanatory view showing a relation between positions of the pixels in the horizontal direction and pixel values of the pixels of the determination area.

FIG. 4B is an explanatory view showing a relation between positions of the pixels in a horizontal direction and pixel values of the pixels of the determination area 40.

As one pixel has one pixel value, pixel values of the adjacent pixels are not continuous. However, by smoothly connecting the pixel values of the pixels along their positions, a waveform line can be drawn as shown by a dotted line in FIG. 4B where the pixel values increase and decrease at a predetermined period. It means that for the determination area 40 as shown in FIG. 4A, the variation of the pixel values is detected to have periodicity.

FIG. 5A to FIG. 5F are explanatory views showing various images which are included in the respective determination areas.

Figure 5A:
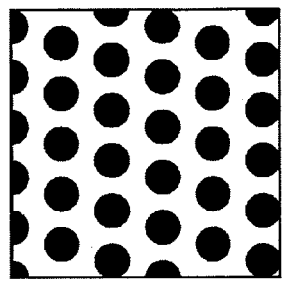
FIG. 5A is an explanatory view showing an image having periodicity.
Figure 5B:
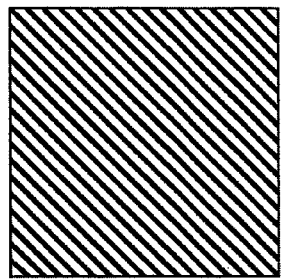
FIG. 5B is an explanatory view showing an image having periodicity.

FIG. 5A shows a halftone image expressed by dots and having periodicity. FIG. 5B also shows a halftone image expressed by hatching and having periodicity.

Figure 5C:
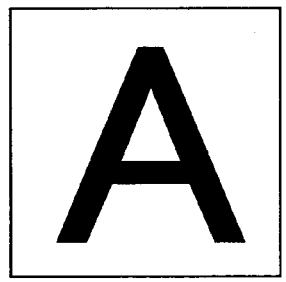
FIG. 5C is an explanatory view showing an image having no periodicity.
Figure 5D:
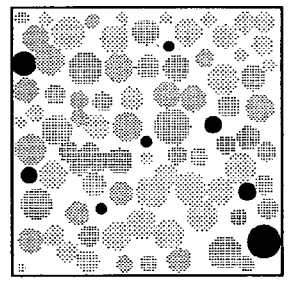
FIG. 5D is an explanatory view showing an image having no periodicity.

FIG. 5C shows an image including a discontinuous area composed of a character and having no periodicity. FIG. 5D also shows an image including a discontinuous area composed of plural dots not regularly positioned and having no periodicity.

Figure 5E:
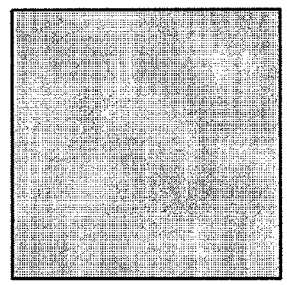
FIG. 5E is an explanatory view showing an image having no periodicity.
Figure 5F:
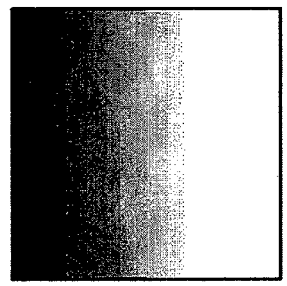
FIG. 5F is an explanatory view showing an image having no periodicity.

FIG. 5E shows an image including a flat area composed of a single color such as a background or the like and having no periodicity. FIG. 5F also shows an image including a flat area composed of a gradation such as a background or the like and having no periodicity.

As a halftone image expressed by halftone dots includes plural dots aligned on a line having an arbitrary screen angle, the dots are aligned with a constant interval in a direction inclined with respect to a horizontal direction but not aligned with a constant interval in the horizontal direction. Therefore, when expressing a relationship between positions and pixel values of pixels aligned in a horizontal direction as shown in FIG. 4B, the amplitude may be different, however, the relationship can be expressed as a waveform line having maximum values and minimum values with a constant interval so that the periodicity can be determined.

By examining the drawings as described in FIG. 3, FIG. 4A and FIG. 4B, it can be easily determined whether the image has periodicity.

The method in how the periodicity determining unit 30 determines whether the determination area of the target image data has periodicity is explained.

Although not shown in the drawings, the periodicity determining unit 30 may includes a period calculation unit that calculates the variation period. The period calculation unit of the periodicity determining unit 30 calculates a variation period of the pixel values of the pixels in the determination area.

Here, the variation period of the pixel values of the pixels in the determination area, which is obtained for determining whether the determination area has periodicity, may not always be a constant. Therefore, an idea of a representative period is adopted for the variation period. An example of obtaining the representative period is explained. The period calculation unit of the periodicity determining unit 30 performs the following operations.

First, positions (peak positions) of the pixels having the maximum pixel values are recorded. Then, a distance between a peak and a next peak is counted to generate a frequency histogram of the distance for the pixels in the determination area. Then, the most frequent distance, which is a mode, is adopted as the representative period. The representative period can be expressed by the number of pixels.

Concretely, for the example shown in FIG. 4B, first, the positions of the white pixels 42 having the maximum pixel values are recorded. Then, the distance between the white pixels 42 adjacent to each other is counted. In the example, there is a peak for almost every six pixels and the distance between the adjacent peaks of six pixels is the largest frequency, therefore the representative period becomes six pixels. For permitting a certain error, the distance of the representative period±1 may also be used.

For the peak positions for obtaining the representative period, the positions of the pixels having the minimum pixel values (the positions of the black pixels 41 in FIG. 4B, for example) may be used instead of the pixels having the maximum pixel values.

Further, when the representative period is obtained based on the positions of the pixels having the maximum pixel values or based on the positions of the pixels having the minimum pixel values, autocorrelation may be used. By using autocorrelation to obtain the representative period, noise resistance can be higher compared with just using the periodicity of the variation of the pixel values. As noises are included in the pixel values, the autocorrelation obtained by plural pixel values can reduce the influence of the noise compared with directly using the pixel values.

Here, the autocorrelation is a correlation between a first signal and a second signal obtained by adding a predetermined phase shift to the first signal. In this case, the autocorrelation is obtained in the determination area, a frequency histogram of the distance for the pixels in the determination area is generated by using the autocorrelation values instead of the pixel values, and the most frequent distance, which is a mode, is adopted as the representative period. As for the autocorrelation values, a covariance S may be used to simplify the calculation or a correlation coefficient R may be used.

The covariance S is an indicator indicating a magnitude of a covariation between two pixel values and can be obtained by the following equation 1, where a pixel value of an "i" th pixel in one of the patterns to be compared is expressed as $x_i$, a pixel value of an "i" th pixel in another one of the patterns to be compared is expressed as $y_i$, an average value of the pixel values of the pixels in the one of the patterns to be compared is expressed as $x_m$, an average value of the pixel values of the pixels in the other of the patterns to be compared is expressed as $y_m$, and the number of pixels included in the patterns is expressed as n.

$$S = \frac{1}{n}\sum_{i=1}^{n}(x_i - x_m)(y_i - y_m) \qquad \text{[Equation 1]}$$

The correlation coefficient R is an indicator indicating a similarity between two random variables, and can be obtained by the following equation 2, where a standard deviation of the one of the patterns to be compared is expressed as $\sigma_x$, and a standard deviation of the other of the patterns to be compared is expressed as $\sigma_y$.

$$R = \frac{\sum_{i=1}^{2}(x_i - x_m)(y_i - y_m)}{\sigma_x \sigma_y} \qquad \text{[Equation 2]}$$

The periodicity determining unit 30 determines whether the determination area has periodicity or not based on the calculated variation period. Concretely, the periodicity determining unit 30 calculates a certainty $C_v$ of the variation period. The periodicity determining unit 30 determines that the determination area has periodicity when the certainty is higher than a threshold value, and determines that the determination area has no periodicity when the certainty is equal to or less than the threshold value.

The certainty $C_v$ can be obtained using the following equation 3. In equation 3, T expresses the representative period, $F_r$ expresses the frequency of the distance corresponding to the representative period T in the frequency histogram, and N expresses the number of pixels included in the determination area. As for the frequency of the distance $F_r$, not only the frequency of the representative period T, but the total frequencies of T±1 may be used for permitting an error in estimating the representative period. Equation 3 expresses a ratio of the pixels having a peak distance same as the representative period among all of the pixels in the determination area as the certainty.

$$C_v = \frac{T \times F_r}{N} \qquad \text{[Equation 3]}$$

The threshold value may be previously set by a user or may be dynamically determined by the periodicity determining unit 30. When the threshold value is set by a user, the threshold value may be determined by obtaining an appropriate certainty for determining whether an area has periodicity by conducting a simulation or an experiment. When the threshold value is dynamically determined by the periodicity determining unit 30, certainty $C_v$ for a halftone area actually having periodicity and certainty $C_v$ for a non-continuous area or a flat area having no periodicity may be obtained and the mean value of them may be used as the threshold value, for example.

Hereinafter, an area where variation of pixel values of pixels has periodicity is referred to as a "periodicity area" while an area other than the periodicity area is referred to as a "non-periodicity area".

The boundary determining unit 31 confirms whether the defective pixel actually belongs to the periodicity area when the periodicity determining unit 30 determines that the determination area including the defective pixel has periodicity. As the periodicity determining unit 30 determines whether the determination area including the target area has periodicity, the image processing apparatus 10 may not include the boundary determining unit 31. However, in this embodiment, the case where the image processing apparatus 10 includes the boundary determining unit 31 is explained.

The defective pixel exists in either of the periodicity area or the non-periodicity area, and the pixel value of the defective pixel can be estimated by pixel values of the pixels near the defective pixel in the same kind of area. For example, when the defective pixel exists in the periodicity area, a target pattern composed of plural continuous pixels including the defective pixel and having the defective pixel at a center may be similar to a pattern existing near the target pattern and therefore the pixel values of the target pattern can be estimated based on the similar pattern.

However, for example, even when the determination area including the defective pixel is determined to have periodicity by the periodicity determining unit 30, if the defective pixel exists at or near a boundary between a periodicity area and a non-periodicity area, the defective pixel may actually belong to a non-periodicity area. In such a case, if the pixel value of the defective pixel is estimated based on pixel values of pixels in a periodicity area, a right pixel value may not be obtained for the defective pixel.

Therefore, the boundary determining unit 31 determines whether the defective pixel belongs to a periodicity area or a non-periodicity area in order to estimate a right pixel value for the defective pixel by using pixel values of pixels in the same kind of area as that of the defective pixel.

The boundary determining unit 31 sets equal to one or more reference areas in the vicinity of the defective pixel for determining whether the defective pixel actually belongs to a periodicity area or a non-periodicity area.

The reference area, similar to the determination area, may be composed of a single line of pixels having a height equal to one pixel, or may be a rectangular area having a height equal to plural pixels. The size of the reference area may be previously set by a user, or may be dynamically set by the image processing apparatus 10 similarly to the above-described determination area. Although not limited so, two of the reference areas may be set at both the left and the right sides of the defective pixel. Alternatively, the reference areas may be set at upper and lower sides of the defective pixel, or the reference areas may be set at the left and the right, and the upper and the lower sides of the defective pixel.

For an example, the boundary determining unit 31 may set two reference areas, a left-side reference area and a right-side reference area at the left and the right sides of the defective pixel respectively so that each reference area includes a predetermined number of pixels. The boundary determining unit 31 may obtain variances of the pixel values for the left-side reference area and the right-side reference area, which is one of the characteristics of the image, and determine whether the defective pixel actually belongs to the periodicity area or the non-periodicity area.

The boundary determining unit 31 may determine that the defective pixel actually belongs to a periodicity area when the variances of both of the left-side reference area and the right-side reference area are equal to or more than a threshold value, determine that the defective pixel actually belongs to a non-periodicity area when the variances of both of the left-side reference area and the right-side reference area are less than the threshold value, or determine that the defective pixel exists at a boundary between a periodicity area and a non-periodicity area when either one of the variances of the left-side reference area or the right-side reference area is equal to or more than the threshold value and the other of the variances of the left-side reference area or the right-side reference area is less than the threshold value.

The reference areas may be set around the defective pixel with a predetermined distance intervene between the defective pixel and the reference areas. The predetermined distance may be equal to three pixels, for example. As for pattern matching, which will be explained later, when halftone dots are positioned every six pixels, a template may include three pixels for each of both the left and the right sides of the defective pixel. Therefore, by setting the reference areas with such a distance intervene between the defective pixel and the reference areas, the pixels nearest to the template, where a pattern most similar to the template may exist at a high possibility, can be set as the reference areas. The distance is not limited to three pixels and may be any value provided that the determination can be appropriately performed.

The variance can be obtained by the following equation 4. In equation 4, $x_i$ expresses a pixel value of "i" th pixel in the reference area, $x_m$ expresses an average value of the pixels in the reference area, and n expresses the number of pixels included in the reference area. Instead of using the variance, a difference between the maximum pixel value (brightness value) and the minimum pixel value (brightness value) of the pixels included in the reference area, a difference between a maximum pixel value of the green component and a minimum pixel value of the green component of the pixels included in the reference area, when the image is a color image, may be used.

$$\sigma^2 = \frac{1}{n}\sum_{i=1}^{n}(x_i - x_m)^2 \qquad \text{[Equation 4]}$$

The first pixel value generating unit 32 generates a pixel value of the defective pixel using a pattern matching method as the supplementing method. For the pattern matching method, template matching may be used. The template matching may be performed by setting a standard pattern as a template including a certain area and having a certain size in an image, and calculating a coincidence value between the template and patterns in a search area in the image to find a pattern similar to the template.

The first pixel value generating unit 32 firstly determines a size of the template in order to actualize this function. The width of the template may be determined based on the above-obtained representative period. The width of the template may be determined to be equal to the distance of the representative period. Then, the height of the template is set. Similar to the width, the height of the template may be determined to be equal to the distance of the representative period. For the width and the height of the template, they are not limited to be equal to the distance of the representative period, and may be determined to be a bit longer or a bit shorter than the distance of the representative period. For example, the width or the height of the template may be longer than the distance of the representative period for one pixel each at the left and the right sides or may be shorter than the distance of the representative period for one pixel each at the left and the right sides. Alternatively, the width or the height of the template may be longer than the distance of the representative period by equal to or more than two pixels each at the left and the right sides or may be shorter than distance of the representative period by equal to or more than two pixels each at the left and the right sides.

When the defective pixel belongs to a halftone area, the template area may be set to be a square where each side has lengths almost the same as the representative period.

FIG. 6A is an explanatory view showing the example of the pixels same as that shown in FIG. 4A. Here, the representative period is equal to 6 pixels. FIG. 6B is an explanatory view showing the pixels corresponding to the representative period including the defective pixel 45.

Figure 6C:
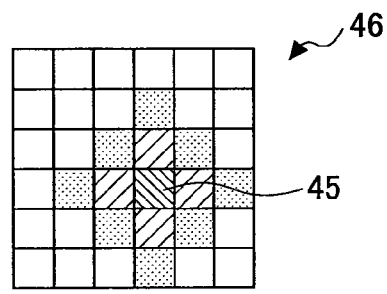
FIG. 6C is an explanatory view showing an example of a template including the defective pixel.

FIG. 6C is an explanatory view showing an example of a template 46 including the defective pixel 45. The template 46 may be a square with a size equal to six pixels in width and equal to six pixels in height when the representative period is equal to six. By setting the template as such, the template can include a group of pixels composing a halftone dot as shown in FIG. 6C. By determining the size of the template to correspond to one of the halftone dots, an optimal, similar pattern can be obtained with using information of only one of the halftone dots when searching a similar pattern.

When the representative period is very small, the size of the template may be set a bit larger than the representative period. For example, when the representative period is equal to three pixels, the width of the template may be five pixels where a pixel is added to both the left and the right sides of the three pixels. By enlarging the size of the template as such, the coincidence value between the template and the comparing pattern can be properly evaluated and the similar pattern can be detected with a high reliability.

The first pixel value generating unit 32 extracts an area including the defective pixel having the above-determined size of the template, to set as the template. At this time, the first pixel value generating unit 32 may set the template such that the defective pixel is included at almost center of the template in both the width and the height. By extracting and setting the area, a pattern similar to the template can be searched without depending on the directional property of a pattern including the defective pixel.

The first pixel value generating unit 32 sets a search area of a predetermined size for searching a similar pattern that is similar to the template.

The search area may be set based on the representative period.

Figure 6D:
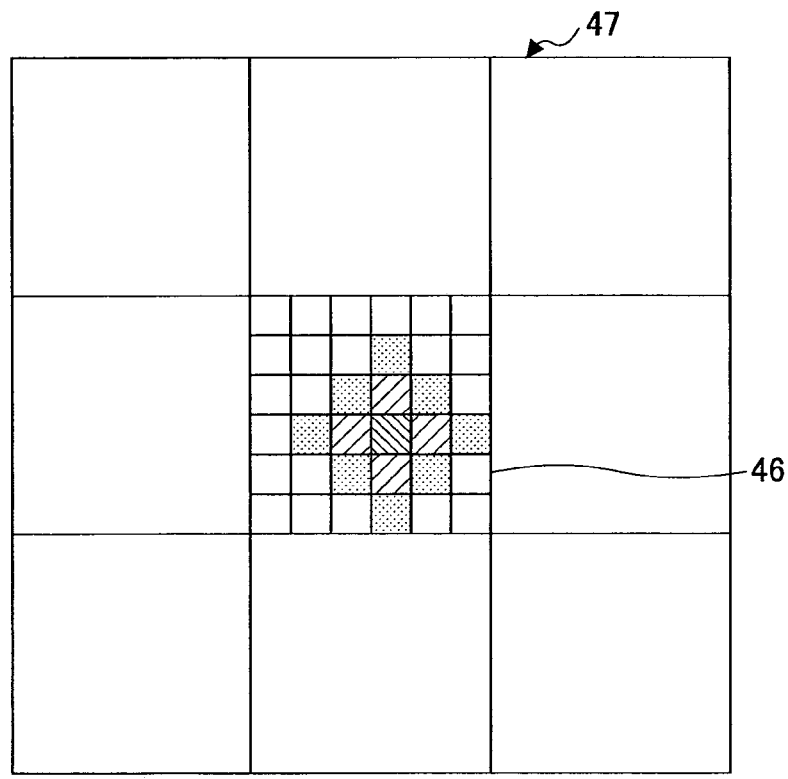
FIG. 6D is an explanatory view showing an example of a search area including the template.

FIG. 6D is an explanatory view showing an example of a search area 47 including the template 46. When the representative period is equal to six pixels in width (with a height of one pixel) as described above, the search area 47 may be a square having 18 pixels in width and 18 pixels in height, which is the same as the number of pixels in width, where six pixels are added to both of the left side and the right side of the template 46. By setting the search area 47 to have the same number of pixels in height as in width, a pattern similar to the template 46 can be searched without depending on the directional property of a pattern of the search area 47. The above-described size of the search area, 18 pixels in width and 18 pixels in height, is just an example and not limited so. The size of the search area 47 may be set larger, 30 pixels in width and 30 pixels in height, for example.

The search area is not limited to the square as described above, when the height of the search area is shorter because of memory limitations for buffering image data or the like, the width of the search area may be set wider as the number of pixels included in the search area is small, accuracy may be lowered.

Further, when the periodicity determining unit 30 determines that the left part area at the left side or the right part area at the right side of the defective pixel has no periodicity, as will be explained with reference to FIG. 10 later, such the part area may be removed from the search area. As an area that has no periodicity may not include a similar pattern, by removing such an area from the search area, an error caused by detecting a wrong similar pattern can be prevented.

After setting the search area as described above, the first pixel value generating unit 32 searches a similar pattern included in the search area 47 by using the generated template. Concretely, the first pixel value generating unit 32 obtains a coincidence value between the pixel values of the template 46 and the pixel values of each of the positions in the search area 47, and selects the position having the largest coincidence value as the similar pattern. For the coincidence value, a difference such as Sum of Absolute Difference (SAD), Sum of Squared Difference (SSD) or the like, a similarity such as a correlation coefficient, a covariance or the like may be used.

Here, the SAD includes extracting a comparing pattern to be compared with a template, obtaining differences between luminance values of pixels at the same position in the template and the comparing pattern, and adding the absolute values of differences to give a total value. Therefore, it can be determined that the comparing pattern is similar to the template when the total value is small, while it can be determined that the comparing pattern is not similar when the total value is large.

The SSD includes squaring the difference between luminance of pixels at the same position in the template and the comparing pattern, and adding the squared value to give a total value. Therefore, it can be determined that the comparing pattern is similar to the template when the total value is small, while the comparing pattern is not similar when the total value is large in this case, as well. The covariance (S) and the correlation coefficient (R) may be obtained in accordance with the above equations 1 and 2 respectively.

The correlation coefficient takes a value between −1 and 1. When the value is close to 1, it means there is a strong positive correlation, when the value is close to 0, it means correlation is weak and when the value is close to −1, it means there is a negative correlation. In other words, when the value is close to 1, it means that the template and the comparing pattern are similar and when the value is closed to −1, it means that a reverse pattern of the template and the comparing pattern or the template and a reverse pattern of the comparing pattern are similar. Therefore, as the value of the correlation coefficient is larger, the similarity is determined to be higher. As the covariance corresponds to the correlation coefficient, as the value of the correlation coefficient is larger, the similarity is determined to be higher.

When evaluating the coincidence value, in order to remove influence of the pixel value of the defective pixel on the coincidence value, the defective pixel may not be used for calculating the coincidence value, or the pixel value of the pixel in the comparing pattern at the corresponding position of the defective pixel is set as a temporarily pixel value of the pixel value of the defective pixel and used for calculating the coincidence value. The first pixel value generating unit 32 may select plural similar patterns from the comparing patterns having higher coincidence values.

Further, when the template includes plural defective pixels, not only the defective pixel having a pixel value to be supplemented, but also the rest of the defective pixels may not be used for calculating the coincidence value, or the pixel values of the pixels in the comparing pattern at the corresponding positions of the defective pixels are set as temporarily pixel values of the pixel values of the defective pixels and used for calculating the coincidence value. The same operation may be performed when the comparing pattern includes a defective pixel or plural defective pixels. Concretely, when the comparing pattern includes a defective pixel, in order to remove influence of the pixel value of the defective pixel on the coincidence value, the defective pixel may not be used for calculating the coincidence value, or the pixel value of the pixel in the template at the corresponding position of the defective pixel is set as a temporarily pixel value of the pixel value of the defective pixel and used for calculating the coincidence value.

Such a defective pixel basically includes a missing pixel value or an incorrect pixel value and it is not appropriate to be used for calculating a coincidence value. For the defective pixel for which the pixel value is already supplemented, the pixel value can be used for calculating the coincidence value.

Figure 7:
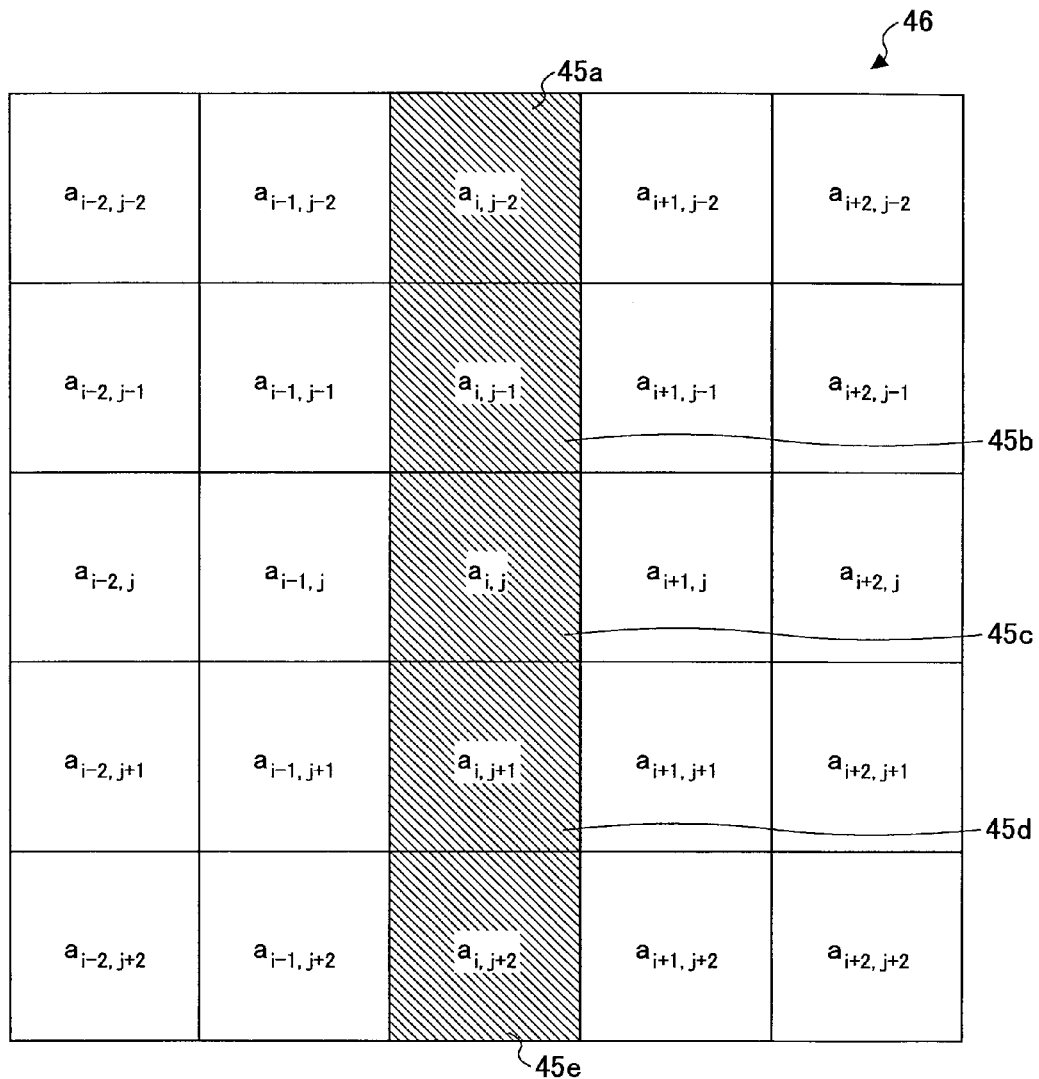
FIG. 7 is an explanatory view showing an example of a template including the defective pixel.

FIG. 7 is an explanatory view showing another example of the template 46 including defective pixels. The template 46 includes pixels $a_{i-2,j-2}$ to $a_{i+2,j+2}$ composed of five pixels in width and five pixels in height.

Here, the template 46 is assumed to include plural defective pixels 45a to 45e provided at the vertical line of "i" at first. Here, it is assumed that a target defective pixel to be supplemented now is the pixel $a_{i,j}$ (45c) and the pixels $a_{i,j-2}$ (45a) and $a_{i,j-1}$ (45b) are already supplemented so that supplemented pixel values are inserted, as the supplementing operation is performed from upper side in order.

At this status, the coincidence value may be calculated as follows.

For a first method, the coincidence value may be calculated based on the pixel values of the pixels other than the defective pixels $a_{i,j-2}$, $a_{i,j-1}$, $a_{i,j}$, $a_{i,j+1}$, and $a_{i,j+2}$.

For a second method, the pixel values of the pixels in the comparing pattern which are positioned at corresponding positions of the defective pixels $a_{i,j-2}$, $a_{i,j-1}$, $a_{i,j}$, $a_{i,j+1}$, and $a_{i,j+2}$ may be respectively used as temporary pixel values for the defective pixels $a_{i,j-2}$, $a_{i,j-1}$, $a_{i,j}$, $a_{i,j+1}$, and $a_{i,j+2}$ and the coincidence value may be calculated based on the pixel values of the pixels other than the defective pixels $a_{i,j-2}$, $a_{i,j-1}$, $a_{i,j}$, $a_{i,j+1}$, and $a_{i,j+2}$ and the temporary pixel values.

For a third method, as the pixel values are already inserted in the defective pixels $a_{i,j-2}$ and $a_{i,j-1}$, these inserted pixel values may be used and for the rest of the defective pixels $a_{i,j}$, $a_{i,j+1}$ and $a_{i,j+2}$ may not be used for calculating the coincidence value.

For a fourth method, as the pixel values are already inserted in the defective pixels $a_{i,j-2}$ and $a_{i,j-1}$, these inserted pixel values may be used and for the rest of the defective pixels $a_{i,j}$, $a_{i,j+1}$ and $a_{i,j+2}$, the temporary pixel values as described may be set by using the pixel values of the pixels in the comparing pattern which are positioned at corresponding positions of the defective pixels $a_{i,j}$, $a_{i,j+1}$, and $a_{i,j+2}$ are respectively used for calculating the coincidence value.

Then, the pixel value of the pixel in the comparing pattern which is the most similar to the template 46, at a position corresponding to the defective pixels 45*c* in the template 46 is obtained. Only when the comparing pattern which is the most similar to the template 46 is used, the pixel value thus obtained is used as the pixel value of the defective pixel 45*c*. When the plural comparing patterns selected from the patterns having higher coincidence value in order are used, the pixel value for the defective pixel 45*c* is generated based on the pixel values of the selected comparing patterns. The pixel value for the defective pixel 45*c* may be generated by just obtaining an average, or applying a weighted value to each of the pixel values where a higher weighted value is applied as the coincidence value becomes higher and then obtaining an average of the values.

Here, the template matching includes a two-dimensional template matching and a one-dimensional template matching.

In two-dimensional template matching, arbitrary areas in the image near the defective pixel, in other words, areas in left, right, upper, lower, or inclined direction of the defective pixel, are extracted as comparing patterns and the comparing pattern most similar to the template is selected by calculating coincidence values between the template and each of the comparing patterns.

In one-dimensional template matching, the template and the comparing patterns are extracted from the line where the defective pixel exists. Then, the comparing pattern most similar to the template is selected by calculating coincidence values between the template and each of the comparing patterns.

In this embodiment, the first pixel value generating unit 32 adopts the two-dimensional template matching. As the one-dimensional template matching is a different supplementing method from the two-dimensional template matching, the second pixel value generating unit 33 or the third pixel value generating unit, which will be explained later, may adopt the one-dimensional template matching.

The first pixel value generating unit 32 obtains a pixel value of a pixel, at a position corresponding to the position of the defective pixel in the template, in the comparing pattern selected as the most similar comparing pattern with respect to the template. Further, at this time, the first pixel value generating unit 32 obtains pixel values of pixels other than the selected pixel in the selected comparing pattern as neighboring pixels. When the template is as shown in FIG. 7, as there are five defective pixels $a_{i,j-2}$, $a_{i,j-1}$, $a_{i,j}$, $a_{i,j+1}$ and $a_{i,j+2}$, the neighboring pixels are 16 pixels four of which are respectively positioned at the left and the right side of each of the defective pixels. This is an example and is not limited so.

The second pixel value generating unit 33 generates a pixel value of the defective pixel using a supplementing method different from that used by the first pixel value generating unit 32. For such a method different from that used by the first pixel value generating unit 32, interpolation may be used. Interpolation includes a nearest neighbor interpolation (a zero order interpolation), a linear interpolation, a parabolic interpolation (a quadratic interpolation), a cubic interpolation, a polynomial interpolation, a spline interpolation, a lagrange interpolation, or the like, and further includes a bilinear interpolation, a bicubic interpolation or the like for which the linear interpolation, the cubic interpolation or the like is extended in two-dimensions.

Figure 8A:
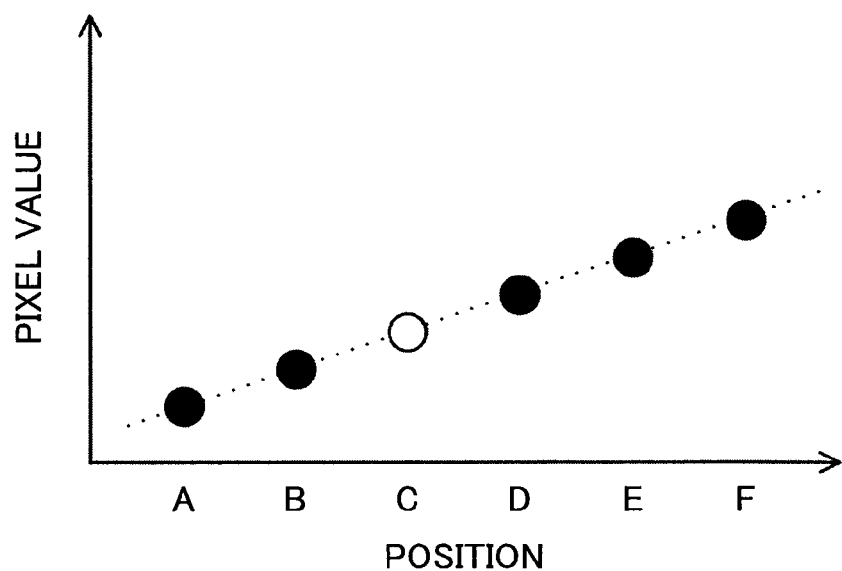
FIG. 8A is an explanatory view showing a relationship between positions and pixel values of pixels which are aligned on a line.

FIG. 8A is an explanatory view showing a relationship between positions and pixel values of pixels A to F which are aligned on a line in this order. Here, the pixel C is a defective pixel for which a pixel value is missed. In this example, it is assumed that the pixel C actually has a pixel value expressed by a white circle as shown in FIG. 8A. In this case, as the position of the pixel moves one to the right, the pixel value increases for a constant value and the relationship between the positions and the pixel values of the pixels can be expressed by a linear function. Therefore, the pixel value of the pixel C, the pixel value for which is to be supplemented, can be obtained by using a linear function obtained based on the positions and the pixel values of the pixels A, B and D to F (linear interpolation).

Figure 8B:
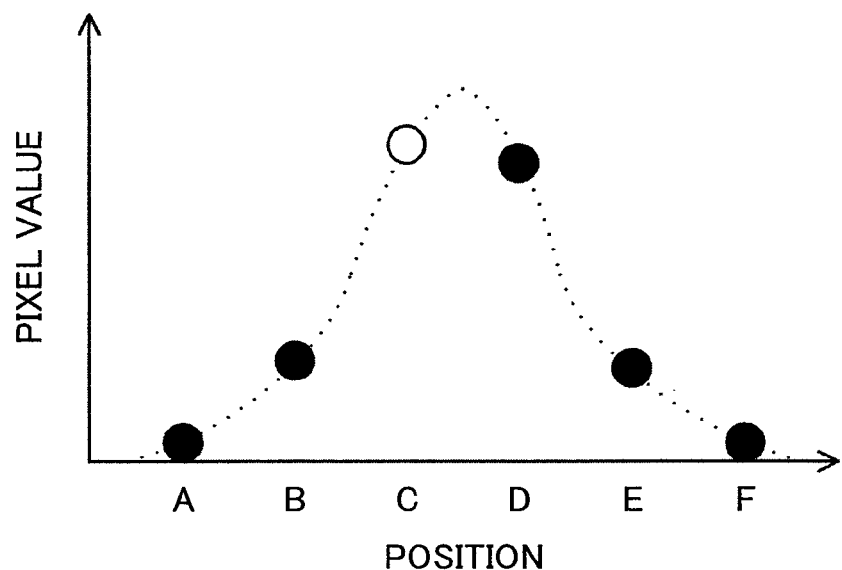
FIG. 8B is an explanatory view showing a relationship between positions and pixel values of pixels which are aligned on a curve.

FIG. 8B is an explanatory view also showing a relationship between positions and pixel values of pixels A to F which are aligned on a curve in this order. Here, the pixel C is a defective pixel for which a pixel value is missed. In this example, it is assumed that the pixel C actually has a pixel value expressed by a white circle as shown in FIG. 8B. In this case, as the relationship between the positions and the pixel values of the pixels is expressed by a curve, an interpolation that fits the curve most may be selected. For example, when the curve is expressed by a quadric, a parabolic interpolation may be adopted, when the curve is expressed by a cubic, a cubic interpolation may be adopted, when the curve is expressed by a polynomial, a polynomial interpolation or a lagrange interpolation may be adopted, and when the curve is expressed by a individual polynomial, a spline interpolation may be adopted.

When interpolation is used for generating the pixel value of the defective pixel, the pixel values of the neighboring pixels may not be updated. As for interpolation, the pixel value of the defective pixel is determined based on the original pixel values of the neighboring pixels, however, when the pixel values of the neighboring pixels are also altered, the pixel value of the defective pixel does not express the interpolated value based on the pixel values of the neighboring pixels anymore. Therefore, in such a case, the pixel values of the neighboring pixels may not be updated. Here, "the pixel values of the neighboring pixels are not updated" includes sending to the pixel value updating unit 36 current pixel values of the neighboring pixels as the estimated pixel values of the neighboring pixels to have the pixel value updating unit 36 substitute the pixel values of the neighboring pixels by the sent pixel values. In such a case, the pixel values of the neighboring pixels actually do not change. Further, the pixel values of the neighboring pixels are not updated" includes sending to the pixel value updating unit 36 a control signal not to update the pixel values of the neighboring pixels.

Although a case where the first pixel value generating unit 32 adopts the pattern matching method and the second pixel value generating unit 33 adopts the interpolation is described in this embodiment, alternatively, the first pixel value generating unit 32 may adopt the interpolation and the second pixel value generating unit 33 may adopt the pattern matching method. Alternatively, the first pixel value generating unit 32 and the second pixel value generating unit 33 may adopt either one of pattern matching methods such as a two-dimensional template matching or a one-dimensional template matching, or either one of interpolations such as a linear interpolation and a spline interpolation.

When the control unit 34 accepts the image data, the control unit 34 sends the image data to the periodicity determining unit 30 and the boundary determining unit 31. Then, the control unit 34 receives the determined results determined by the periodicity determining unit 30 and the boundary determining unit 31, and determines which of the first pixel value generating unit 32 and the second pixel value generating unit 33 is to be used for generating pixel values based on the received result.

Concretely, in this embodiment, the control unit 34 determines to adopt the first pixel value generating unit 32 which uses the pattern matching method when the periodicity determining unit 30 determines that the variation of the pixel values in the determination area has periodicity as well as the boundary determining unit 31 determines that the defective pixel belongs to the periodicity area and otherwise the control unit 34 determines to adopt the second pixel value generating unit 33 which uses the interpolation, for generating pixel values.

The control unit 34 then sends either one of the image data to the first pixel value generating unit 32 or the second pixel value generating unit 33 which is determined to be adopted, receives pixel values generated by the adopted pixel value generating unit, and then sends the pixel values to the pixel value supplementing unit 35.

The pixel value supplementing unit 35 inserts the pixel value sent from the control unit 34 to the defective pixel set by the pixel setting unit. Concretely, when the defective pixel does not have a pixel value at this time, the pixel value supplementing unit 35 sets the pixel value sent from the control unit 34 as a pixel value of the defective pixel, and when the defective pixel already has a pixel value, which may be an incorrect pixel value or the like, the pixel value supplementing unit 35 substitutes the pixel value of the defective pixel by the pixel value sent from the control unit 34. By the above operation, supplementing operation for one defective pixel is completed.

The pixel value updating unit 36 updates pixel values (original pixel values) of the neighboring pixels positioned near the defective pixel and included in a predetermined area in the template by the pixel values of the neighboring pixels generated by the first pixel value generating unit 32. As for the pixel values used for updating the pixel values of the neighboring pixels, the pixel values generated by the first pixel value generating unit 32 may be used, or the values obtained by averaging the pixel values generated by the first pixel value generating unit 32 and original pixel values of the neighboring pixels may be used. For the average value, a weighted value may be applied to each of the pixel values where the weighted value may be different based on the distance from the defective pixel. For example, as a distance from the defective pixel becomes longer, a higher weighted value is applied to the original pixel value of the target neighboring pixel.

The range of the neighboring pixels for which the pixel values are updated may be set to include a few pixels of the left and the right sides, for each, of the defective pixel. For example, the area may be set to be the same size as the template as described above. The range may be previously set, or may be determined based on the representative period determined by the periodicity determining unit 30, similarly to the method of determining the size of the template. When the boundary determining unit 31 determines that the defective pixel exists at or near the boundary of the periodicity area and the non-periodicity area, the pixel values of the neighboring pixels may not be updated, or the range may be decreased. In such a case, the range may be set not to include the non-periodicity area as the non-periodicity area may include an area where pixels having a constant pixel value are continuously existent, and when a pixel value of such a pixel is altered, the pixels do not consist with each other. The pixel value updating unit 36 may include a range setting unit (not shown in the drawings) that sets the range of the predetermined area for the neighboring pixels based on the variation period (representative period) calculated by the period calculation unit of the periodicity determining unit 30.

When the pixel setting unit detects plural defective pixels, the above operations performed by each of the units as shown in FIG. 2 are performed where insertion of a pixel value into the defective pixel and updating of pixel values of neighboring pixels are performed for each of the defective pixels.

Figure 9:
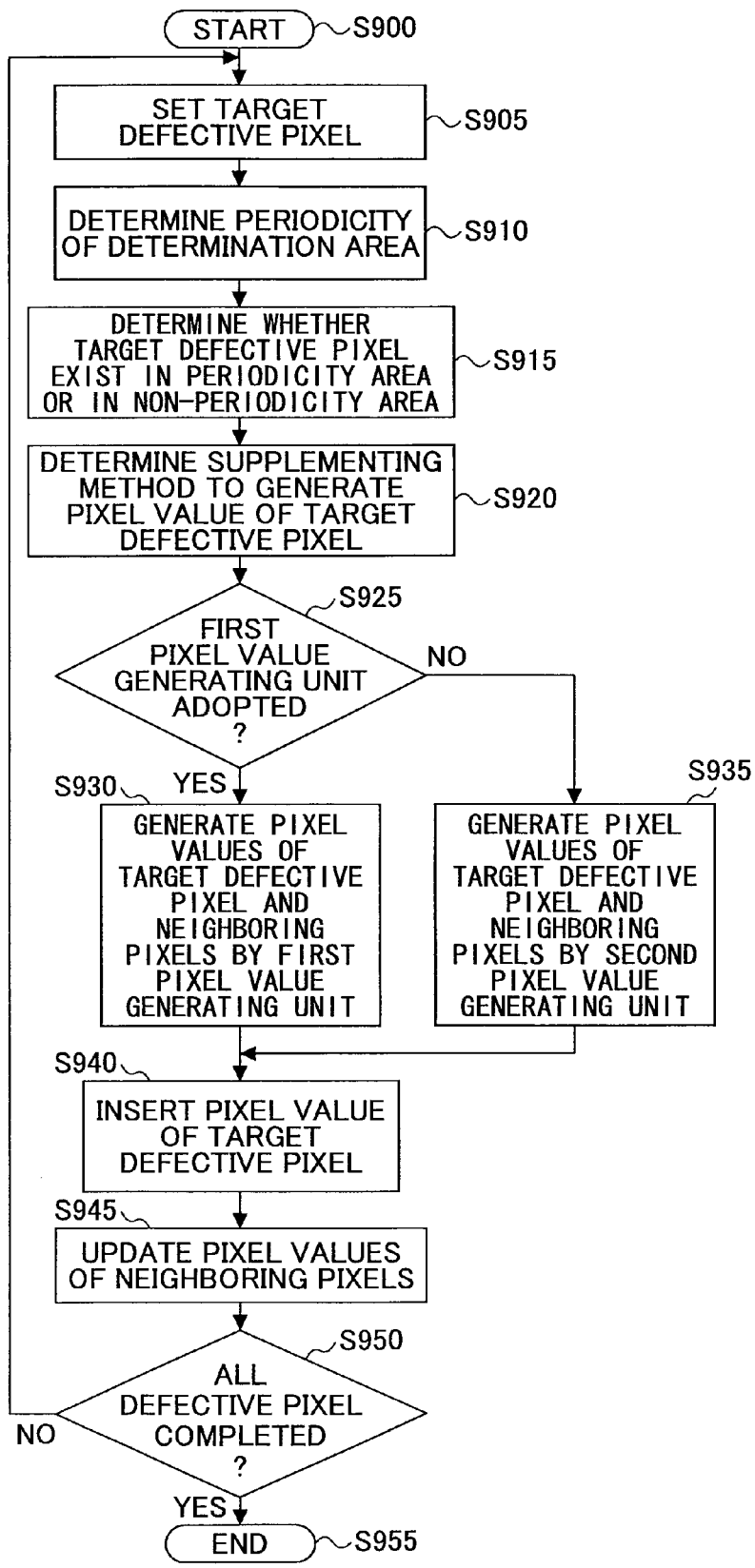
FIG. 9 is a flowchart showing an example of a supplementing operation performed by each unit of the image processing apparatus shown in FIG. 2.

FIG. 9 is a flowchart showing an example of a supplementing operation performed by each of the units of the image processing apparatus 10 shown in FIG. 2.

When the supplementing operation is started (step S900), the pixel setting unit detects a defective pixel for which a pixel value is to be inserted and sets the detected pixel as a target defective pixel (step S905). Detection of the defective pixel may be performed in accordance with the above-described method. When plural defective pixels are included and are detected in a target image, the defective pixels are given numbers based on the coordinates of the pixels and one of the defective pixels is selected in order in accordance with the given numbers. In step S905, one of the selected defective pixels is set as the target defective pixel.

In step S910, the periodicity determining unit 30 sets a determination area including the target defective pixel, and determines whether a variation of pixel values of pixels included in the determination area has periodicity. Concretely, the periodicity determining unit 30 sets the determination area using the above-described method of setting the size of the determination area and determines whether the determination area has periodicity using the above-described method of determining periodicity.

Subsequently in step S915, the boundary determining unit 31 determines whether the target defective pixel exists at a boundary between the periodicity area and the non-periodicity area. The boundary determining unit 31 may set a left-side reference area and a right-side reference area by using the above-described method of setting the size of the reference area, calculate variances for the left-side reference area and the right-side reference area and determines whether the target defective pixel exists in the periodicity area. When the calculated variances of both of the left-side reference area and the right-side reference area are equal to or more than a threshold value, the boundary determining unit 31 determines that the target defective pixel exists in the periodicity area.

Then, a supplementing method to generate a pixel value of the target defective pixel is determined in step S920. In this step, the control unit 34 determines which of the first pixel value generating unit 32 and the second pixel value generating unit 33 is to be adopted to generate the pixel value of the target defective pixel based on the result determined in step S910 and in step S915. As described above, when the periodicity determining unit 30 and the boundary determining unit 31 determine that the target defective pixel exists in the periodicity area, the control unit 34 determines to adopt the pattern matching method while the periodicity determining unit 30 and the boundary determining unit 31 determine that the target defective pixel does not exist in the periodicity area, the control unit 34 determines to adopt interpolation.

The control unit 34 determines whether the first pixel value generating unit 32 is adopted in step S925. When the supplementing method determined in step S920 is the pattern matching method, it is determined that the first pixel value generating unit 32 using the pattern matching method is adopted. Otherwise, it is determined that the first pixel value generating unit 32 is not adopted.

When it is determined that the first pixel value generating unit 32 is adopted in step S925, the process proceeds to step S930. In step S930, the first pixel value generating unit 32, by the pattern matching method, selects a pattern similar to a template including the target defective pixel and generates a pixel value to be inserted to the pixel value of the target defective pixel based on the selected similar pattern.

In this step, the first pixel value generating unit 32 may further generate pixel values of neighboring pixels in addition to the pixel value of the target defective pixel.

When, on the other hand, it is determined that the first pixel value generating unit 32 is not adopted in step S925, the process proceeds to step S935. In step S935, the second pixel value generating unit 33 using the interpolation is adopted. The second pixel value generating unit 33 generates a pixel value of the target defective pixel by the interpolation.

In this step, the second pixel value generating unit 33 may further generate pixel values of neighboring pixels in addition to the pixel value of the target defective pixel.

In step S940, the pixel value supplementing unit 35 inserts the pixel value of the defective pixel generated in step S930 or in step S935. By this, supplementation for one defective pixel is completed.

In step S945, the pixel value updating unit 36 updates the pixel values of the neighboring pixels using the pixel values of the neighboring pixels generated in step S930 or in step S935.

In step S950, whether all of the defective pixels included in the target area are completed is determined. When not all of the defective pixels in the target image are completed, the process goes back to step S905, and the next defective pixel is set as a target defective pixel and the same operation is performed. When all of the defective pixels in the target image are completed in step S950, the process proceeds to step S955 to terminate this operation.

FIG. 10 is a flowchart showing the operation of step S910 and step S915 in FIG. 9 in detail for determining whether the variation of pixel values of pixels included in the determination area has periodicity.

When this operation is started (step S1000), the periodicity determining unit 30 calculates a representative period based on pixel values of pixels included in the determination area in step S1005. It means that the periodicity determining unit 30 calculates the certainty and then calculates the representative period, which is necessary for determining the size of the template or the search area. Then, periodicity of the determination area is determined in step S1010.

Subsequently, the periodicity determining unit 30 divides the determination area and sets a left part area and a right part area while setting the target defective pixel as a center in step S1015. In this embodiment, the periodicity determining unit 30 further includes a part periodicity determining unit for determining periodicity of part areas.

In this embodiment, the periodicity determining unit 30 divides the determination area, sets the left part area and the right part area and determines whether the left part area and the right part area have periodicity.

The periodicity determining unit 30 calculates a representative period and determines periodicity for the left part area in step S1020. The periodicity determining unit 30 calculates a representative period and determines periodicity for the right part area in step S1025. When these determinations are completed, the determining of periodicity is terminated (step S1030).

Figure 11A:
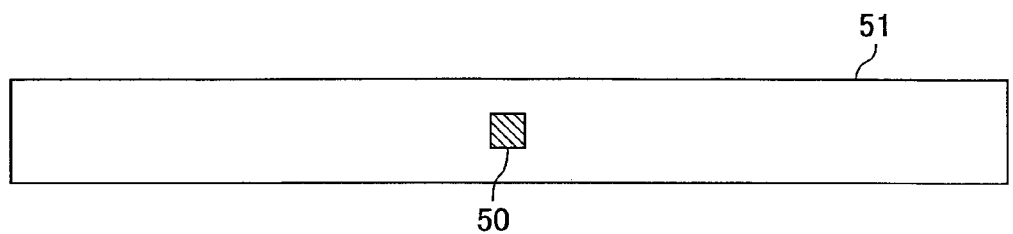
FIG. 11A is an explanatory view showing a determination area.
Figure 11B:
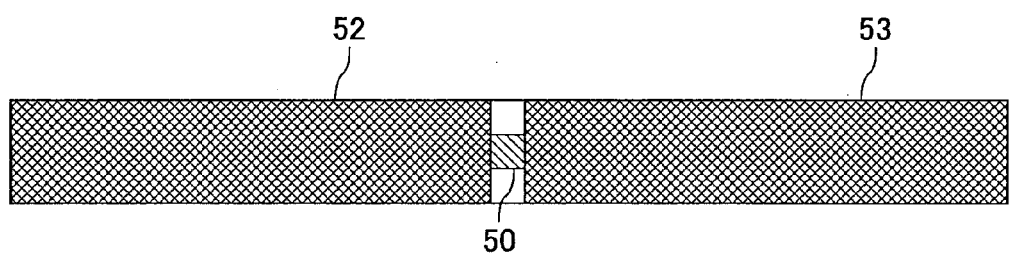
FIG. 11B is an explanatory view showing a determination area.

FIG. 11A is an explanatory view showing a determination area 51 including a target defective pixel 50. In steps 1015 to 1025 of FIG. 10, the determination area 51 is set to have the target defective pixel 50 positioned at its center as shown in FIG. 11A.

Then, the periodicity determining unit 30 divides the left part and the right part of the defective pixel 50 of the determination area 51 to set the left part as a left part area 52 and the right part as a right part area 53 at both the left and the right sides of the defective pixel 50. The periodicity determining unit 30 determines periodicity of the left part area 52 and the right part area 53.

Figure 11C:
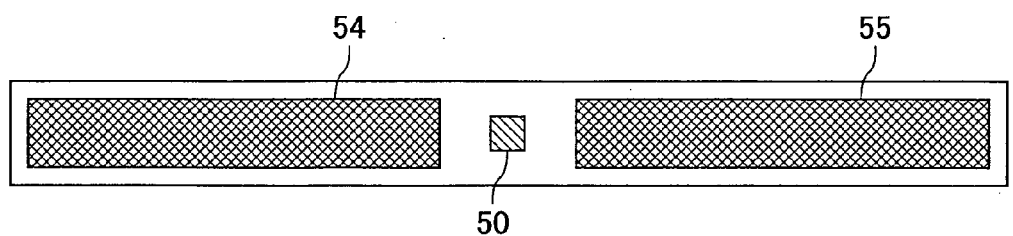
FIG. 11C is an explanatory view showing a determination area.

Although in this example, the left part area 52 and the right part area 53 are set to be rather large including all of the pixels at the left side and the right side of the determination area except only the defective pixel 50 and pixels just above and just below the defective pixel 50, when periodicity is appropriately determined, the left part area 54 and the right part area 55 may be set bit smaller as shown in FIG. 11C. Further, the left part area 52 and the right part area 53 may not be included in the determination area 51 and parts of them may not be included in the determination area 51.

Although the determination area 51 is set as a two-dimensional area that has a height equal to three pixels and a width equal to more than three pixels in FIG. 11A, the determination area 51 may be set as a one-dimensional area that has a height equal to that of the defective pixel 50, it means one pixel, and a width equal to more than three pixels.

By determining periodicity of the left part area and the right part area of the defective pixel and the determination area including the defective pixel, the periodicity determining unit 30 can determine whether the target defective pixel is included in the periodicity area with high accuracy. It means that the periodicity determining unit 30 and the may determine that the target defective pixel is included in the periodicity area when all of the determination area, the left part area and the right part area have periodicity.

Figure 12:
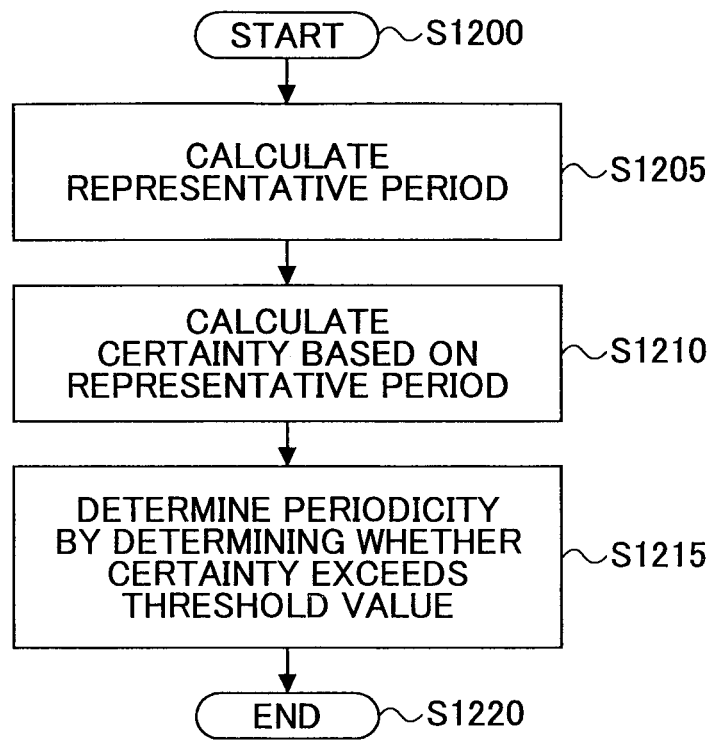
FIG. 12 is a flowchart showing the operation performed in step S1010, step S1020 and step S1025 in FIG. 10 in detail.

Further, FIG. 12 is a flowchart showing the operation performed in step S1010, step S1020 and step S1025 in FIG. 10 in detail for determining whether the variation of pixel values of pixels included in the determination area has periodicity.

When the operation of each step (step S1010, step S1020 or step S1025) is started (step S1200), the periodicity determining unit 30 calculates the mode of the distance between peaks of the pixels having the maximum pixel value in the determination area and obtains the mode as the representative period of the pixel values as described above in step S1205. As the representative period of the determination area is already calculated in step S1005 shown, in FIG. 10, the process for calculating the representative period of the determination area may not be repeated and the representative period calculated in step S1005 may be used here.

Subsequently, in step S1210, the certainty is calculated using the representative period obtained in step S1205. The periodicity determining unit 30 determines whether the obtained certainty exceeds a threshold value in step S1215 to determine whether the area has periodicity. Then, the operation is terminated in step S1220. The periodicity determining unit 30 determines that the area has periodicity when the certainty exceeds the threshold value and determines that the area does not have periodicity when the certainty is equal to or less than the threshold value.

Although in the operation shown in FIG. 10, the representative period in the determination area is determined first, periodicity of the determination area is determined, periodicity of the left part area is determined, and then periodicity of the right part area is determined to determine whether the target defective pixel is included in the periodicity area, the operation is not limited so. For example, periodicity of the determination area may be determined after periodicity of the left part area and the right part area are determined.

Further, periodicity of the left part area and the right part area may be determined first and when both of the left part area and the right part area are determined to have periodicity and have the same representative period, such the representative period may be adopted as the representative period for the determination area and the determination area may also be determined to have periodicity. On the other hand, when both of the left part area and the right part area are determined not to have periodicity, the determination area may be determined to have no periodicity.

Further, when at least one of the left part area and the right part area has periodicity, the target defective pixel may be, determined to be included in the periodicity area, and when both of the left part area and the right part area have no periodicity, the target defective pixel may be determined to be included in the non-periodicity area. This is because when at least one of the left part area and the right part area has periodicity, the possibility that the target defective pixel is included in the periodicity area becomes high. Therefore, the pixel value of the defective pixel may be generated in accordance with the supplementing method which is used for the periodicity area with high accuracy.

Figure 13:
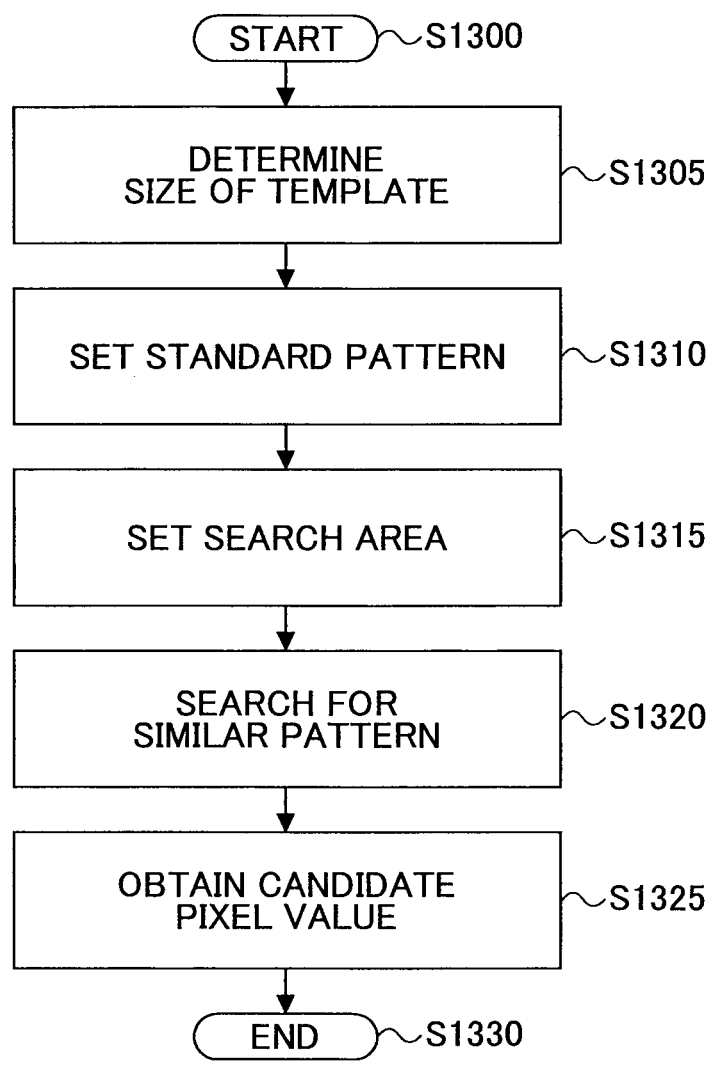
FIG. 13 is a flowchart showing the operation performed in step S930 by the first pixel value generating unit.

FIG. 13 is a flowchart showing the operation performed in step S930 by the first pixel value generating unit 32 for generating a pixel value of the defective pixel by template matching.

When the operation is started (step S1300), the first pixel value generating unit 32 determines a size of the template in step S1305. The size of the template may be determined based on the representative period as described above.

The first pixel value generating unit 32 extracts an area including the target defective pixel and having the determined size based on the determined size of the template and sets the area as a standard pattern in step S1310. Then, the first pixel value generating unit 32 determines and sets a search area for searching a pattern similar to the standard pattern (hereinafter simply referred to as a "similar pattern") based on the representative period in accordance with the above-described method in step S1315. The first pixel value generating unit 32 searches the similar pattern using the standard pattern as a template in the search area. The similar pattern may be detected by obtaining coincidence values between the template and each of the comparing patterns to select a comparing pattern for which the coincidence value with the template becomes the highest.

The first pixel value generating unit 32 compares the selected similar pattern and the template used for searching the similar pattern, selects a candidate pixel in the similar pattern at a position corresponding to that of the defective pixel in the template, and obtains a pixel value of the selected candidate pixel as a candidate pixel value to be inserted in the target defective pixel in step S1325. Further, the first pixel value generating unit 32 sets the selected similar pattern as a designated area, and obtains the pixel values of the pixels near the selected candidate pixel as candidate pixel values for pixel values of the neighboring pixels of the target defective pixel. After this process, the process proceeds to step S1330 to finish the operation.

When only one similar pattern is selected, the pixel values of the pixels corresponding to the target defective pixel or the neighboring pixels may be used, and when plural similar pattern are selected, the pixel values for the target defective pixel or the neighboring pixels may be obtained by calculating the average or the like as mentioned above.

Second Embodiment

Figure 14:
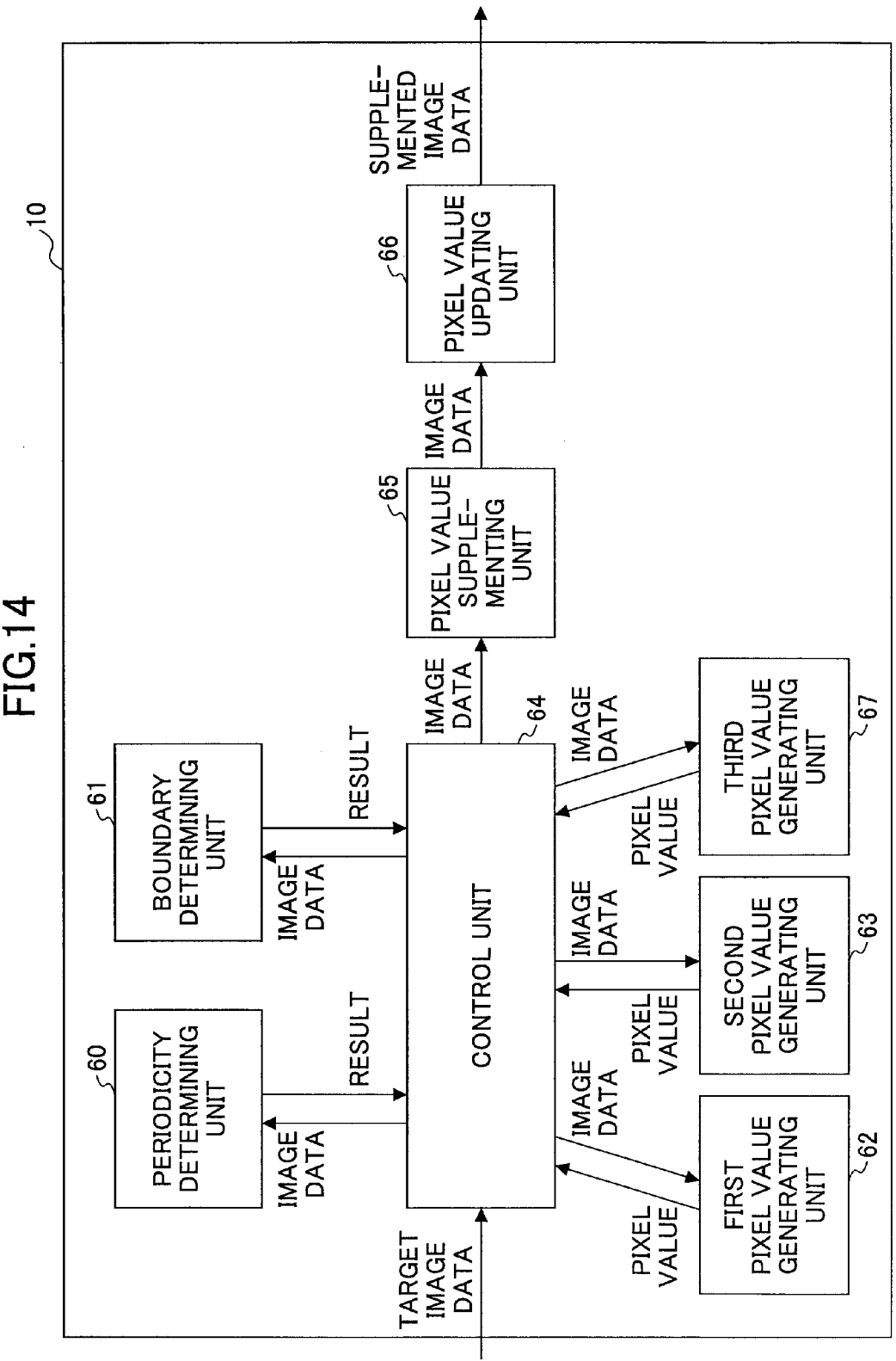
FIG. 14 is a block diagram showing a functional structure of the image processing apparatus of an embodiment.

The image processing apparatus according to the second embodiment will be explained. FIG. 14 shows an example of a structure of the image processing apparatus.

The image processing apparatus 10 of this embodiment also includes a periodicity determining unit 60, a boundary determining unit 61, a first pixel value generating unit 62, a second pixel value generating unit 63, a control unit 64, a pixel value insertion unit 65, and a pixel value updating unit 66 same as the image processing apparatus 10 of the first embodiment shown in FIG. 2. In addition, the image processing apparatus 10 further includes a third pixel value generating unit 67 that adopts a supplementing method different from those adopted by the first pixel value generating unit 62 and the second pixel value generating unit 63 to generate pixel values of the defective pixel and the neighboring pixels.

The periodicity determining unit 60, the boundary determining unit 61, the first pixel value generating unit 62, the second pixel value generating unit 63, the control unit 64, the pixel value supplementing unit 65, and the pixel value updating unit 66 of the image processing apparatus 10 of the second embodiment respectively has the same function as the periodicity determining unit 30, the boundary determining unit 31, the first pixel value generating unit 32, the second pixel value generating unit 33, the control unit 34, the pixel value supplementing unit 35, and the pixel value updating unit 36 of the image processing apparatus 10 of the above-described first embodiment.

As for the third pixel value generating unit 67, although the supplementing method is different, the third pixel value generating unit 67 generates pixel values of the defective pixel and the neighboring pixels similarly to the first pixel value generating unit 62 and the second pixel value generating unit 63, and therefore, the explanation is not shown here.

The control unit 64 determines a supplementing method based on the determination by the periodicity determining unit 60 and the boundary determining unit 61, determines which one of the first pixel value generating unit 62, the second pixel value generating unit 63 or the third pixel value generating unit 67 is to be adopted and have the selected pixel value generating unit generate the pixel value to be inserted for the defective pixel. Alternatively, all of the first pixel value generating unit 62, the second pixel value generating unit 63 and the third pixel value generating unit 67 may previously and parallelly generate a pixel value for the defective pixel, and then the control unit 64 may select which one of the pixel value generating units is to be adopted.

Figure 15:
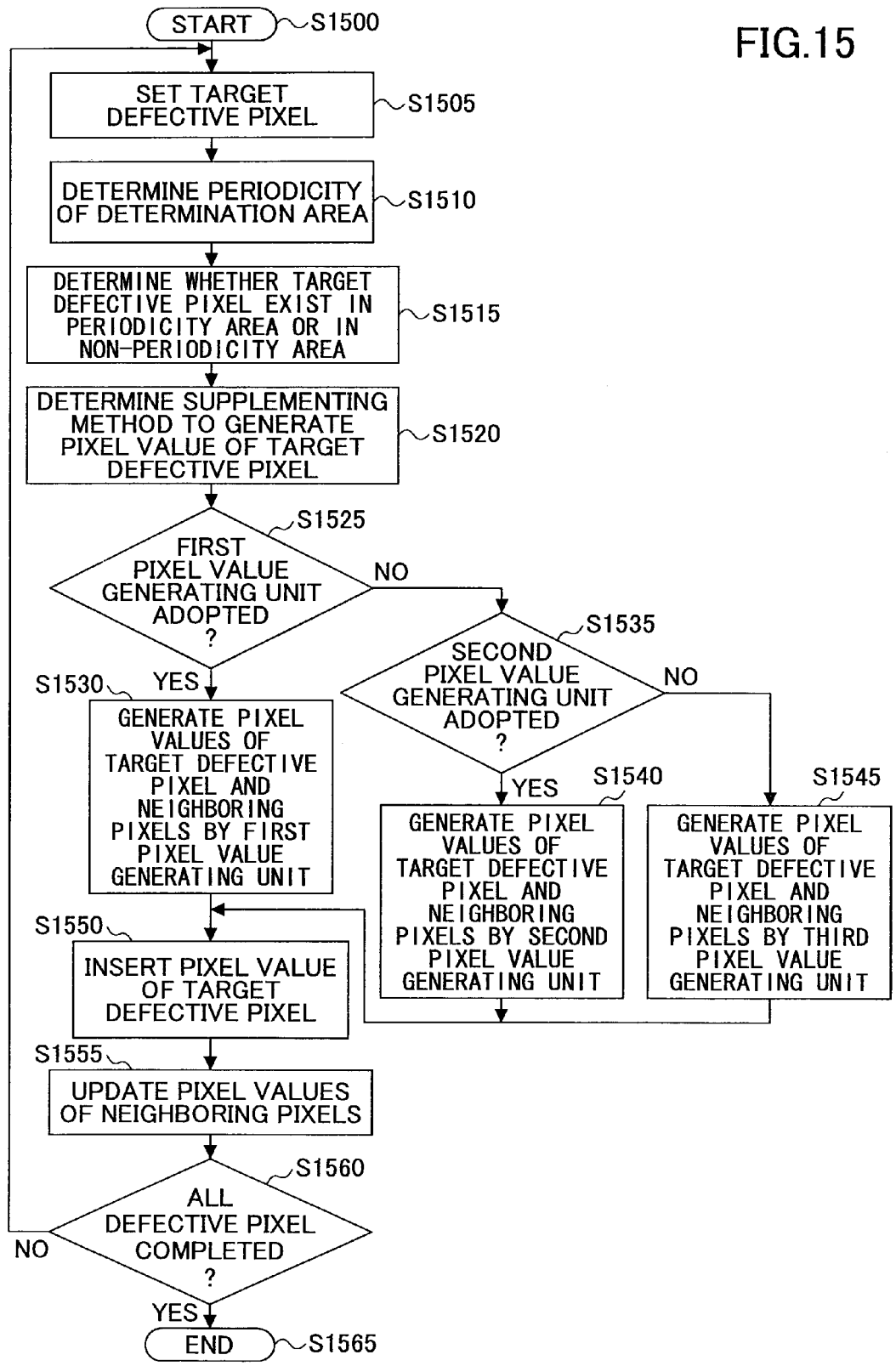
FIG. 15 is a flowchart showing an example of a supplementing operation performed by each unit of the image processing apparatus shown in FIG. 14.

The FIG. 15 is a flowchart showing an example of a supplementing operation performed by each unit of the image processing apparatus 10 shown in FIG. 14.

When supplementing operation is started (step S1500), the pixel setting unit detects a defective pixel for which a pixel value is to be inserted and sets the detected pixel as a target defective pixel (step S1505). Detection of the defective pixel may be performed in accordance with the above-described method. When plural defective pixels are included and detected in a target image, the defective pixels are given numbers based on the coordinates of the pixels and one of the defective pixels is selected in order in accordance with the given numbers. In step S1505, one of the selected defective pixels is set as the target defective pixel.

In step S1510, the periodicity determining unit 60 sets a determination area including the target defective pixel, and determines whether a variation of pixel values of pixels included in the determination area has periodicity. Concretely, the periodicity determining unit 60 sets the determination area using the above-described method of setting the size of the determination area and determines whether the determination area has periodicity using the above-described method of determining periodicity.

Subsequently in step S1515, the boundary determining unit 61 determines whether the target defective pixel exists in a periodicity area or in a non-periodicity area. The boundary determining unit 61 may set a left-side reference area and a right-side reference area by using the above-described method of setting the size of the reference area, calculate variances for the left-side reference area and the right-side reference area, and determines that the target defective pixel exists in the periodicity area when the calculated variances of both of the left-side reference area and the right-side reference area are equal to or more than a threshold value.

Then, a supplementing method to generate a pixel value of the target defective pixel is determined in step S1520. In this step, the control unit 64 determines which one of the supplementing method adopted by the first pixel value generating unit 62, the supplementing method adopted by the second pixel value generating unit 63 and the supplementing method adopted by the third pixel value generating unit 67 is to be used for generating a candidate pixel value based on the result determined in step S1510 and in step S1515.

For example, the control unit 64 may determine to use the template matching method adopted by the first pixel value generating unit 62 when the determination area including the target defective pixel has periodicity and the target defective pixel exists in the periodicity area, to use interpolation adopted by the second pixel value generating unit 63 when the determination area including the target defective pixel has periodicity but the defective pixel exists in the non-periodicity area, and to use other supplementing method adopted by the third pixel value generating unit 67 when the determination area including the target defective pixel has no periodicity and the target defective pixel exists in the non-periodicity area.

Alternatively, the control unit 64 may determine to use the template matching method adopted by the first pixel value generating unit 62 when the period of the determination area including the defective pixel is short and the target defective pixel exists in the periodicity area, to use interpolation adopted by the second pixel value generating unit 63 when the period of the determination area including the target defective pixel is short and the target defective pixel exists in the non-periodicity area, and to use other supplementing method adopted by the third pixel value generating unit 67 for other case.

The supplementing method adopted by the third pixel value generating unit 67 may be any method as long as it is different from those adopted by the first pixel value generating unit 62 and the second pixel value generating unit 63. For example, when the first pixel value generating unit 62 adopts two-dimensional template matching and the second pixel value generating unit 63 adopts cubic interpolation, the third pixel value generating unit 67 may adopt a method other than two-dimensional template matching and cubic interpolation, such as one-dimensional template matching, nearest neighbor interpolation, linear interpolation, parabolic interpolation, polynomial interpolation, spline interpolation, lagrange interpolation, bilinear interpolation, bicubic interpolation, or the like.

The control unit 64 determines whether the first pixel value generating unit 62 is adopted based on the determined supplementing method in step S1525. When the control unit 64 determines that the first pixel value generating unit 62 is adopted in step S1525, the process proceeds to step S1530. Then, the first pixel value generating unit 62 generates a pixel value of the target defective pixel by the adopting supplementing method.

At this time, the first pixel value generating unit 62 may set a neighboring area composed of pixels including the target defective pixel as a center and a predetermined number of pixels positioned near the target defective pixel, for example, corresponding to the template for the pixels in which the pixel values are to be updated. Then, the first pixel value generating unit 62 may set the pixels included in the neighboring area other than the target defective pixel as neighboring pixels, and generates pixel values of the neighboring pixels.

When, on the other hand, it is determined that the first pixel value generating unit 62 is not adopted in step S1525, the process proceeds to step S1535. In step S1535, the control unit 64 determines whether the second pixel value generating unit 63 is adopted. When it is determined that the second pixel value generating unit 63 is adopted, the process proceeds to step S1540.

The second pixel value generating unit 63 generates a pixel value of the target defective pixel by adopting the supplementing method. In this case, as the supplementing method is interpolation, the pixel values of the neighboring pixels may not to be updated as described above.

When it is determined that the second pixel value generating unit 63 is not adopted in step S1535, the process proceeds to step S1545. In step S1545, the third pixel value generating unit 67 generates a pixel value of the target defective pixel by adopting the supplementing method.

The image processing apparatus 10 may further include a setting table in which pixel values of the neighboring pixels, are to be updated or not is previously set for each of the supplementing methods. The pixel value generating units may generate pixel values of the neighboring pixels when it is set to update the pixel values of the neighboring pixels by referring to the setting table. When the supplementing method adopted by the pixel value generating unit is interpolation, it can be set to not update the pixel values of the neighboring pixels in the setting table. When it is set to update the pixel values of the neighboring pixels in the setting table, the neighboring area may also be set in the setting table as well.

Further, when the supplementing method is one-dimensional pattern matching, it may be set to not update the pixel values of the neighboring pixels while when the supplementing method is two-dimensional pattern matching, it may be set to update the pixel values of the neighboring pixels in the setting table.

It means that for one-dimensional pattern matching, as the template is selected to include pixels in the same line as the target defective pixel, even when the pixel values of the neighboring pixels are updated, pixel values of pixel positions upper or lower of the target defective pixel are not updated and therefore, the updated part cannot be consistence with other parts. However, for two-dimensional pattern matching, such a problem does not occur. Therefore, it may be set to update the pixel values of the neighboring pixels in the setting table just for two-dimensional pattern matching so that the pixel value generating unit adopting two-dimensional pattern matching, for example, the first pixel value generating unit 62, may generate the pixel values of the neighboring pixels.

In step S1550, the pixel value supplementing unit 65 receives the pixel value of the target defective pixel generated in step S1530, in step S1540 or in step S1545, and inserts the pixel value to the target defective pixel set in step S1505. Then, in step S1555, the pixel value updating unit 66 receives the pixel values of the neighboring pixels generated in step S1530, in step S1540 or in step S1545, and substitutes the pixel values of the neighboring pixels in the neighboring area to update the pixel values of the neighboring pixels.

Then, in step S1560, it is determined whether all of the defective pixels included in the target area are completed. When the plural defective pixels are set in step S1505, it is determined whether all of the defective pixels set in step S1505 are completed. When it is determined that all of the defective pixels in the target image are completed in step S1560, the process proceeds to step S1565 to terminate this operation. When it is determined that not all of the defective pixels in the target image are completed in step S1560, the process goes back to step S1505, and the next defective pixel is set as a target defective pixel and the same operation is performed.

Further, the image processing apparatus 10 of this embodiment may further include a validity verifying unit that verifies a first candidate pixel value of the defective pixel generated by the first pixel value generating unit 62, the second pixel value generating unit 63, or the third pixel value generating unit 67. With this verification, when the first candidate pixel value is not valid, the control unit 64 may select another pixel value generating unit other than the pixel value generating unit that has generated the first candidate pixel value of the defective pixel to generate a second candidate pixel value of the defective pixel. The validity verifying unit may further verify the second candidate pixel value of the defective pixel.

For example, the validity verifying unit may verify the candidate pixel value of the defective pixel with associated data obtained when the candidate pixel value is generated.

For example, when the first pixel value generating unit 62 adopting a pattern matching method as the supplementing method is adopted, the associated data may contain a difference or similarity between the template and the comparing pattern. At this time, as for the pixel value of the defective pixel in the template, the pixel value may be removed from the consideration or the candidate pixel value of the defective pixel generated by the first pixel value generating unit 62 may be used. For the difference or similarity, SAD, SSD, correlation coefficient, covariance or the like as described above may be used.

The validity verifying unit may determine whether the candidate pixel value of the defective pixel is valid or invalid by determining whether the difference is less than a threshold value or whether the similarity is equal to or more than a threshold value. The validity verifying unit may determine that the candidate pixel value of the defective pixel is valid when the difference is less than the threshold value or when the similarity is equal to or more than the threshold value. Therefore, in the validity verifying unit, the condition to determine that the candidate pixel value of the defective pixel is valid is that the difference is less than the threshold value or the similarity is equal to or more than the threshold value. The threshold values may be previously set by a user or may be dynamically determined as same as the above-described thresholds.

The control unit 64 may have the validity verifying unit verify a first candidate pixel value of the defective pixel generated by the first pixel value generating unit 62, have the second pixel value generating unit 63 generate a second candidate pixel value of the defective pixel when the first candidate pixel value is determined to be invalid, have the validity verifying unit verify the second candidate pixel value, and have the third pixel value generating unit 67 generate a third candidate pixel value of the defective pixel when the second candidate pixel value is determined to be invalid. Alternatively, the control unit 64 may have all of the first pixel value generating unit 62, the second pixel value generating unit 63, and the third pixel value generating unit 67 previously and parallelly generate a candidate pixel value of the defective pixel, and selects one of the candidate pixel values based on the verified result by the validity verifying unit.

According to the embodiments, the image processing apparatus 10 includes the periodicity determining unit 30 or 60, the boundary determining unit 31 or 61, the first pixel value generating unit 32 or 62, the second pixel value generating unit 33 or 63, the control unit 34 or 64, the pixel value supplementing unit 35 or 65, and the pixel value updating unit 36 or 66 as a basic structure.

The image processing apparatus 10 may further include the pixel setting unit as described in the first embodiment, or the validity verifying unit or the third pixel value generating unit 67 as described in the second embodiment.

The image processing apparatus 10 may have a structure where one of, two of, or all of the pixel setting unit, the third pixel value generating unit 67, and the validity verifying unit are added to the basic structure. Further, the image processing apparatus 10 may include more than three pixel value generating units, not limited to the first pixel value generating unit 32 or 62, the second pixel value generating unit 33 or 63, and the third pixel value generating unit 67. Further, the image processing apparatus 10 may not include the boundary determining unit 31 or 61 as the periodicity determining unit 30 or 60 can determine whether the determination area has a periodicity.

In addition to the image processing apparatus 10, a method of detecting image using the image processing apparatus 10, a program readable by a computer to actualize the method, or a recording medium that stores the program may also be provided. The recording medium may be a FD, a CD, a DVD, a SD card, a USB memory or the like to be distributed.

Further, the image processing apparatus may further include, a validity verifying unit that verifies whether the generated candidate pixel value of the defective pixel is valid based on associated data obtained when the first pixel value generating unit generates the candidate pixel value of the defective pixel, a third pixel value generating unit that generates a pixel value of the defective pixel by a third supplementing method different from the first supplementing method and the second supplementing method, wherein the control unit determines which one of the first pixel value generating unit, the second pixel value generating unit, or the third pixel value generating unit is to be adopted to generate the pixel value of the defect value based on the determination by the periodicity determining unit, the control unit has the second pixel value generating unit generate the candidate pixel value of the defective pixel when the validity verifying unit verifies that the generated candidate pixel value of the defective pixel is invalid, has the validity verifying unit verify the candidate pixel value of the defective pixel generated by the second pixel value generating unit, and has the third pixel value generating unit generate the candidate pixel value of the defective pixel when the validity verifying unit verifies that the generated candidate pixel value of the defective pixel is invalid.

For the method of supplementing the pixel value of the defective pixel, determining whether the determination area set to include the defective pixel is the periodicity area may include calculating a variation period of the pixel values of the pixels in the determination area, and updating the pixel values of the neighboring pixels may include setting the range of the predetermined area based on the variation period calculated in the calculating the variation period.

The method of supplementing the pixel value of the defective pixel may further include setting one or more reference area(s) adjacent to the defective pixel in the target image when the determination area is determined to be the periodicity area, determining for each of the reference area(s) whether the reference area is the periodicity area, and determining that the defective pixel exists whether at a boundary between a periodicity area and a non-periodicity area when at least one of the reference area(s) is determined to be the non-periodicity area.

For the method of supplementing the pixel value of the defective pixel, in updating the pixel values of the neighboring pixels, the pixel values of the neighboring pixels are determined not to be updated when the defective pixel is determined to exist at the boundary between the periodicity area and the non-periodicity area.

For the method of supplementing the pixel value of the defective pixel, in the updating the pixel values of the neighboring pixels, the pixel values of the neighboring pixels except the pixels included in the reference area that is determined to exist at the boundary between the periodicity area and the non-periodicity area when the defective pixel is determined to exist at the boundary between the periodicity area and the non-periodicity area are determined to be updated.

For the method of supplementing the pixel value of the defective pixel, the first supplementing method may be a pattern matching method and the second supplementing method may be interpolation.

For the method of supplementing the pixel value of the defective pixel, in the updating the pixel values of the neighboring pixels, the pixel values of the neighboring pixels are determined not to be updated when the second pixel value generating unit is determined to be adopted.

The method of supplementing the pixel value of the defective pixel may further include verifying whether the generated candidate pixel value of the defective pixel is valid based on associated data obtained when the first pixel value generating unit generates the candidate pixel value of the defective pixel, wherein the second pixel value generating unit is determined to generate the candidate pixel value of the defective pixel when the generated candidate pixel value generated by the first pixel value generating unit is verified to be invalid.

For the method of supplementing the pixel value of the defective pixel, in determining which of the pixel value generating units is to be adopted to generate the candidate pixel value of the defective pixel, it is determined which of the first pixel value generating unit, the second pixel value generating unit, or a third pixel value generating unit in which a candidate pixel value of the defective pixel is generated by a third supplementing method different from the first supplementing method and the second supplementing method is to be adopted to generate the candidate pixel value of the defective pixel based on the determination whether the determination area is the periodicity area or the non-periodicity area.

The present invention is not limited to the specifically disclosed embodiments, and variations and modifications may be made without departing from the scope of the present invention.

The present application is based on Japanese Priority Application No. 2011-016125 filed on Jan. 28, 2011, the entire contents of which are hereby incorporated herein by reference.

The invention claimed is:

1. An image processing apparatus comprising:
a periodicity determining unit that sets a determination area including a defective pixel having a pixel value to be supplemented in a target image and determines whether the determination area is a periodicity area where pixel values of pixels included in the determination area periodically vary or a non-periodicity area where pixel values of pixels included in the determination area do not periodically vary;
a first pixel value generating unit that generates a candidate pixel value of the defective pixel and candidate pixel values of neighboring pixels positioned near the defective pixel and included in a predetermined area by a first supplementing method;
a second pixel value generating unit that generates a candidate pixel value of the defective pixel by a second supplementing method different from the first supplementing method;
a control unit that determines which of the first pixel value generating unit and the second pixel value generating unit is to be adopted to generate the candidate pixel value of the defective pixel based on the determination by the periodicity determining unit;
a pixel value supplementing unit that inserts the candidate pixel value of the defective pixel generated by either one of the first pixel value generating unit or the second pixel value generating unit determined to be adopted by the control unit; and
a pixel value updating unit that updates pixel values of the neighboring pixels using the candidate pixel values of the neighboring pixels generated by the first pixel value generating unit and original pixel values of the neighboring pixels when the first pixel value generating unit is determined to be adopted by the control unit.

2. The image processing apparatus according to claim 1, wherein the control unit determines whether to have the pixel value updating unit update the pixel values of the neighboring pixels based on the determination by the periodicity determining unit.

3. The image processing apparatus according to claim 2, wherein the periodicity determining unit includes a period calculation unit that calculates a variation period of the pixel values of the pixels in the determination area, and the pixel value updating unit includes a range setting unit that sets the range of the predetermined area based on the variation period calculated by the period calculation unit.

4. The image processing apparatus according to claim 1, wherein the control unit determines to adopt the first pixel value generating unit when the periodicity determining unit determines that the determination area is the periodicity area.

5. The image processing apparatus according to claim 4, wherein the first supplementing method is a pattern matching method, the first pixel value generating unit sets a standard pattern including the defective pixel as a template, selects one or more similar patterns which are similar to the template from a search area set in the target image, obtains the candidate pixel value of the defective pixel and the candidate pixel values of the neighboring pixels from the selected similar patterns based on the positions of the defective pixel and the neighboring pixels in the standard pattern and positions of pixels in the selected similar patterns.

6. The image processing apparatus according to claim 1, wherein the first supplementing method is a pattern matching method, the first pixel value generating unit sets a standard pattern including the defective pixel as a template, selects one or more similar patterns which are similar to the template from a search area set in the target image, obtains the candidate pixel value of the defective pixel and the candidate pixel values of the neighboring pixels from the selected similar patterns based on the positions of the defective pixel and the neighboring pixels in the standard pattern and positions of pixels in the selected similar patterns.

7. The image processing apparatus according to claim 1, further comprising:
a boundary determining unit that sets one or more reference areas in the vicinity of the defective pixel in the target image when the periodicity determining unit determines that the determination area is the periodicity areas, and determines whether the defective pixel exists at a periodicity area, a non-periodicity area or the boundary between the periodicity area and the non-periodicity area based on the characteristics of the image in the reference areas.

8. The image processing apparatus according to claim 7, wherein the control unit determines not to have the pixel value updating unit update the pixel values of the neighboring pixels when the defective pixel is determined not to exist at the periodicity area by the boundary determining unit.

9. The image processing apparatus according to claim 7, wherein the control unit determines to have the pixel value updating unit update the pixel values of the neighboring pixels except the pixels included in the reference area that is determined not to exist at the periodicity area by the boundary determining unit.

10. The image processing apparatus according to claim 1, wherein the first supplementing method is a pattern matching method and the second supplementing method is interpolation.

11. The image processing apparatus according to claim 10, wherein the control unit determines not to have the pixel value updating unit update the pixel values of the neighboring pixels when the second pixel value generating unit is determined to be adopted.

12. The image processing apparatus according to claim 1, further comprising:
a validity verifying unit that verifies whether the generated candidate pixel value of the defective pixel is valid based on associated data obtained when the first pixel value generating unit generates the candidate pixel value of the defective pixel,
wherein the control unit has the second pixel value generating unit generate the candidate pixel value of the defective pixel when the validity verifying unit verifies that the generated candidate pixel value of the defective pixel is invalid.

13. The image processing apparatus according to claim 1, further comprising:
a third pixel value generating unit that generates a candidate pixel value of the defective pixel by a third supplementing method different from the first supplementing method and the second supplementing method,
wherein the control unit determines which one of the first pixel value generating unit, the second pixel value generating unit, or the third pixel value generating unit is to be adopted to generate the candidate pixel value of the defect value based on the determination by the periodicity determining unit.

14. A method of supplementing a pixel value of a defective pixel having a pixel value to be supplemented included in a target image, comprising:
determining whether a determination area set to include the defective pixel is a periodicity area where pixel values of pixels included in the determination area periodically vary or a non-periodicity area where pixel values of pixels included in the determination area do not periodically vary;
determining which of a first pixel value generating unit in which a candidate pixel value of the defective pixel and candidate pixel values of neighboring pixels positioned near the defective pixel and included in a predetermined area are generated by a first supplementing method and a second pixel value generating unit in which a candidate pixel value of the defective pixel is generated by a second supplementing method different from the first supplementing method is to be adopted to generate the candidate pixel value of the defective pixel based on the determination whether the determination area is the periodicity areas or the non-periodicity area;
inserting the candidate pixel value of the defective pixel generated by either one of the first pixel value generating unit or the second pixel value generating unit determined to be adopted; and
updating pixel values of the neighboring pixels using the candidate pixel values of the neighboring pixels generated by the first pixel value generating unit and original pixel values of the neighboring pixels when the first pixel value generating unit is determined to be adopted to generate the candidate of the pixel value of the defective pixel.

15. The method of supplementing the pixel value of the defective pixel according to claim 14, wherein in the updating pixel values of the neighboring pixels, whether to have the pixel value updating unit update the pixel values of the neighboring pixels is determined based on the determination whether the determination area is the periodicity area or the non-periodicity area.

* * * * *